US008862917B2

(12) United States Patent
Ulmer et al.

(10) Patent No.: US 8,862,917 B2
(45) Date of Patent: Oct. 14, 2014

(54) DYNAMIC SLEEP FOR MULTICORE COMPUTING DEVICES

(75) Inventors: Tracy A. Ulmer, Westminister, CO (US); Andrew J. Frantz, Superior, CO (US); Norman S. Gargash, Boulder, CO (US); Michael Abel, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 13/312,678

(22) Filed: Dec. 6, 2011

(65) Prior Publication Data
US 2013/0073884 A1 Mar. 21, 2013

Related U.S. Application Data

(60) Provisional application No. 61/536,207, filed on Sep. 19, 2011.

(51) Int. Cl.
G06F 1/32 (2006.01)
G06F 1/00 (2006.01)
(52) U.S. Cl.
CPC ............ G06F 1/3203 (2013.01); G06F 1/3237 (2013.01); Y02B 60/32 (2013.01); G06F 1/3287 (2013.01)
USPC ................ 713/320; 713/324; 712/28; 712/32
(58) Field of Classification Search
USPC .............................. 713/320, 324; 712/28, 32
See application file for complete search history.

(56) References Cited

U.S. PATENT DOCUMENTS

| 7,428,645 | B2* | 9/2008 | O'Connor et al. | 713/300 |
|---|---|---|---|---|
| 7,689,839 | B2 | 3/2010 | Uguen et al. | |
| 8,108,056 | B2* | 1/2012 | Schultz et al. | 700/7 |
| 8,156,275 | B2* | 4/2012 | de Cesare et al. | 710/200 |
| 2006/0026447 | A1 | 2/2006 | Naveh et al. | |
| 2006/0053326 | A1 | 3/2006 | Naveh et al. | |
| 2008/0301474 | A1 | 12/2008 | Bussa et al. | |
| 2009/0089602 | A1* | 4/2009 | Bose et al. | 713/340 |
| 2009/0204834 | A1 | 8/2009 | Hendin et al. | |
| 2010/0161938 | A1 | 6/2010 | Heddes et al. | |
| 2010/0162256 | A1* | 6/2010 | Branover et al. | 718/104 |
| 2011/0173474 | A1 | 7/2011 | Salsbery et al. | |

OTHER PUBLICATIONS

Chandra, Anshuman, et al. "On Using Twisted Ring Counters for Testing Embedded Cores in System-on-a-Chip Designs"; IEEE Instrumentation and Measurement Technology Conference; Budapest, Hungary; May 21-23, 2001.
International Search Report and Written Opinion—PCT/US2012/053352—ISA/EPO—Nov. 7, 2012.

(Continued)

Primary Examiner — Stefan Stoynov
(74) Attorney, Agent, or Firm — Nicholas A. Cole

(57) ABSTRACT

The aspects enable a multi-core processor or system on chip to determine a low power configuration that provides the most system power savings by placing selected resources in a low power mode depending upon acceptable system latencies, dynamic operating conditions (e.g., temperature), expected idle time, and the unique electrical characteristics of the particular device. Each of the cores/processing units treated in a symmetric fashion, and each core may choose its operating state independent of the other cores, without performing complex handshaking or signaling operations.

76 Claims, 10 Drawing Sheets

(56) References Cited

OTHER PUBLICATIONS

Li F., et al., "Compiler Directed Proactive Power Management for Networks", Cases 2005: International Conference on Compilers, Architecture, and Synthesis for Embedded Systems; Sep. 24-27, 2005, San Francisco, California, USA, ACM Press, New York, NY, Sep. 24, 2005, pp. 137-146, XP007907412, ISBN: 978-1-59593-149-8 figures 1-4, 6 table 1 abstract 1. Introduction and motivation; p. 137-p. 138 3. Architecture and power model; p. 139-p. 140 4.3. Example; p. 142, 4.4. Discussion; p. 142-p. 143.

* cited by examiner

DYNAMIC SLEEP FOR MULTICORE COMPUTING DEVICES

RELATED APPLICATIONS

This application claims the benefit of priority to U.S. Provisional Application No. 61/536,207, entitled "Dynamic Sleep For Multicore Computing Devices" filed Sep. 19, 2011, the entire contents of which are hereby incorporated by reference.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. For example, mobile electronic devices now commonly include system-on-chips (SoCs) and/or multiple microprocessor cores embedded on a single substrate, allowing mobile device users to execute complex and power intensive software applications on their mobile devices. As a result, a mobile device's battery life and power consumption characteristics are becoming ever more important considerations for consumers of mobile devices.

SUMMARY

The various aspects include methods of conserving power in a multicore computing device that include maintaining a reference count in memory for each low power resource shared by more than one core of the multicore computing device, independently adjusting a value stored in memory based on each core's power state and each core's usage of the low power resource associated with the memory location, and using the value at the memory location to determine when to enter a system low power configuration. Aspect methods may further include identifying resources that may be placed in a low power mode based upon a flag bit setting, registering a latency requirement on a per-core or global basis, selecting a most stringent latency requirement from the registered latency requirements, evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core, selecting a combination of low power resource modes that maximizes potential power savings and has a total latency requirement that is less than or equal to the selected worst case latency requirement on the current core, and entering the selected combination of low power resource modes by executing an enter function of each of the selected low power modes on each of the identified resources. In an aspect, entering the selected combination of low power resource modes by executing an enter function of each of the selected low power modes on each of the identified resources may include executing the enter function when the reference count value equals zero, for shared modes. In an aspect, the method may further include determining potential power savings of each evaluated low power resource mode based upon a potential power savings per unit time at a current temperature times an expected idle time, for the idle time expected on the current core. In an aspect, each core of the multicore computing device may operate under an operating system that is different from that of one or more of the other cores in the multicore computing device. In an aspect, at least one core of the multicore computing device shares at least one resource that binds the core to operations of at least one other core, and each core is configured to enter and exit low power modes independent of each of the other cores. In an aspect, the multicore computing device may include a resource power manager (RPM) processor for managing resources shared by two or more execution environments. In an aspect, the method may include determining which cores are asleep by accessing a variable shared between cores running threads and cores running idle threads, wherein the shared variable is incremented by each core upon the performance of an enter function of an idle thread and decremented by each core upon the performance of an exit function of the idle thread. In an aspect, the method further may include using a spinlock to protect against one core starting an RPM transaction while another core sends another RPM transaction. In an aspect, using a spinlock to protect against one core starting an RPM transaction while another core is sending an RPM transaction may include holding the spinlock during a RPM start operation and during a RPM stop operation. In an aspect, each core in the multicore computing device may write to disjoint parts of a sleep set, and using a spinlock to protect against one core starting an RPM transaction while another core is sending an RPM transaction may include releasing the spinlock when adding resources to the sleep set. In an aspect, the method may include marking a resource for auto-invalidate, and invalidating, in the RPM processor, a sleep set associated with the marked resource. In an aspect, the method may include invalidating a previous transaction such that resources from the previous transaction do not enter their sleep set undesirably. In an aspect, each core in the multicore computing device may have a subsystem power management (SPM) hardware block that controls the power state of that core and handshakes with the RPM processor when the core enters its low power mode, and the method may further include detecting, in the RPM sleep driver, that a spinlock is currently being held, ignoring the transaction and not sending a sleep set transaction in response to detecting that the spinlock is currently being held, and not applying the sleep set on the RPM processor despite the SPM hardware block of each core performing a handshake with the RPM. In an aspect, the method may include receiving, in an RPM driver, a spinlock in active context, entering a sleep mode of a first core of the multicore computing device, initiating an idle process on a zeroth core of the multicore computing device while waiting for an RPM acknowledgment interrupt, solving, for sleep modes on the zeroth core, and choosing a global low power mode for the zeroth core to enter, entering the global low power mode on the zeroth core, receiving the RPM acknowledgment interrupt on the zeroth core, and releasing the spinlock. In an aspect, the method may include initiating a sending of an RPM message on a zeroth core, receiving, in an RPM driver, an operating system lock, entering a sleep mode on a first core of the multicore computing device, and building an RPM transaction, initiating a sending of a sleep set on the first core, receiving a sleep set transaction request on the RPM driver from the first core and checking to determine if the operating system lock is held, and ignoring sleep set transaction request and sending an interrupt signal to the first core if it is determined that the operating system lock is held.

Further aspects include a computing device that may include a memory, and one or more processors coupled to the memory, wherein the one or more processors are configured with processor-executable instructions so the computing device performs operations including maintaining a reference count in memory for each low power resource shared by more than one core of the multicore computing device, independently adjusting a value stored in memory based on each core's power state and each core's usage of the low power resource associated with the memory location, and using the value at the memory location to determine when to enter a system low power configuration. In an aspect, the one or more processors may be configured with processor-executable instructions so the computing device performs operations may further include identifying resources that may be placed in a low power mode based upon a flag bit setting, registering a latency requirement on a per-core or global basis, selecting a most stringent latency requirement from the registered latency requirements, evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core, selecting a combination of low power resource modes that maximizes potential power savings and has a total latency requirement that is less than or equal to the selected worst case latency requirement on the current core, and entering the selected combination of low power resource modes by executing an enter function of each of the selected low power modes on each of the identified resources. In an aspect, the one or more processors may be configured with processor-executable instructions so the computing device performs operations such that entering the selected combination of low power resource modes by executing an enter function of each of the selected low power modes on each of the identified resources may include executing the enter function when the reference count value equals zero, for shared modes. In an aspect, the one or more processors may be configured with processor-executable instructions so the computing device performs operations may further include determining potential power savings of each evaluated low power resource mode based upon a potential power savings per unit time at a current temperature times an expected idle time, for the idle time expected on the current core. In an aspect, the one or more processors may be configured with processor-executable instructions so the computing device performs operations such that each core of the multicore computing device operates under an operating system that is different from that of one or more of the other cores in the multicore computing device. In an aspect, the one or more processors may be configured with processor-executable instructions so the computing device performs operations such that at least one core of the multicore computing device shares at least one resource that binds the core to operations of at least one other core, and each core is configured to enter and exit low power modes independent of each of the other cores. In an aspect, the one or more processors may be configured with processor-executable instructions so the computing device performs operations such that the multicore computing device may include a resource power manager (RPM) processor for managing resources shared by two or more execution environments. In an aspect, the one or more processors may be configured with processor-executable instructions so the computing device performs operations may further include determining which cores are asleep by accessing a variable shared between cores running threads and cores running idle threads, wherein the shared variable is incremented by each core upon the performance of an enter function of an idle thread and decremented by each core upon the performance of an exit function of the idle thread. In an aspect, the one or more processors may be configured with processor-executable instructions so the computing device performs operations such that the processor is configured with processor-executable instructions to perform operations may further include using a spinlock to protect against one core starting a resource power manager (RPM) transaction while another core sends another RPM transaction. In an aspect, the one or more processors may be configured with processor-executable instructions so the computing device performs operations such that using a spinlock to protect against one core starting an RPM transaction while another core is sending an RPM transaction may include holding the spinlock during a RPM start operation and during a RPM stop operation. In an aspect, the one or more processors may be configured with processor-executable instructions so the computing device performs operations such that each core in the multicore computing device writes to disjoint parts of a sleep set, and wherein using a spinlock to protect against one core starting an RPM transaction while another core is sending an RPM transaction may include releasing the spinlock when adding resources to the sleep set. In an aspect, the one or more processors may be configured with processor-executable instructions so the computing device performs operations may further include marking a resource for auto-invalidate, and invalidating, in the RPM processor, a sleep set associated with the marked resource. In an aspect, the one or more processors may be configured with processor-executable instructions so the computing device performs operations may further include invalidating a previous transaction such that resources from the previous transaction do not enter their sleep set undesirably. In an aspect, the one or more processors may be configured with processor-executable instructions so the computing device performs operations such that each core in the multicore computing device has a subsystem power management (SPM) hardware block that controls the power state of that core and handshakes with the RPM processor when the core enters its low power mode, the method may further include detecting, in an RPM sleep driver, that a spinlock is currently being held, ignoring the transaction and not sending a sleep set transaction in response to detecting that the spinlock is currently being held, and not applying the sleep set on the RPM processor despite the SPM hardware block of each core performing a handshake with the RPM. In an aspect, the one or more processors may be configured with processor-executable instructions so the computing device performs operations may further include receiving, in an RPM driver, a spinlock in active context, entering a sleep mode of a first core of the multicore computing device, initiating an idle process on a zeroth core of the multicore computing device while waiting for an RPM acknowledgment interrupt, solving, for sleep modes on the zeroth core and choosing a global low power mode for the zeroth core to enter, entering the global low power mode on the zeroth core, receiving the RPM acknowledgment interrupt on the zeroth core, and releasing the spinlock. In an aspect, the one or more processors may be configured with processor-executable instructions so the computing device performs operations may further include initiating a sending of an RPM message on a zeroth core, receiving, in an RPM driver, an operating system lock, entering a sleep mode on a first core of the multicore computing device and building an RPM transaction, initiating a sending of a sleep set on the first core, receiving a sleep set transaction request on the RPM driver from the first core and checking to determine if the operating system lock is held, and ignoring sleep set transaction request and sending an interrupt signal to the first core if it is determined that the operating system lock is held.

Further aspects include a non-transitory processor-readable storage medium having stored thereon processor-executable instructions configured cause a server to perform operations that may include maintaining a reference count in memory for each low power resource shared by more than one core of the multicore computing device, independently adjusting a value stored in memory based on each core's power state and each core's usage of the low power resource associated with the memory location, and using the value at the memory location to determine when to enter a system low power configuration. In an aspect, the one or more processors may be configured with processor-executable instructions so the computing device performs operations may further include identifying resources that may be placed in a low power mode based upon a flag bit setting, registering a latency requirement on a per-core or global basis, selecting a most stringent latency requirement from the registered latency requirements, evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core, selecting a combination of low power resource modes that maximizes potential power savings and has a total latency requirement that is less than or equal to the selected worst case latency requirement on the current core, and entering the selected combination of low power resource modes by executing an enter function of each of the selected low power modes on each of the identified resources. In an aspect, the stored processor-executable software instructions may be configured to cause a processor to perform operations such that entering the selected combination of low power resource modes by executing an enter function of each of the selected low power modes on each of the identified resources may include executing the enter function when the reference count value equals zero, for shared modes. In an aspect, the stored processor-executable software instructions may be configured to cause a processor to perform operations may further include determining potential power savings of each evaluated low power resource mode based upon a potential power savings per unit time at a current temperature times an expected idle time, for the idle time expected on the current core. In an aspect, the stored processor-executable software instructions may be configured to cause a processor to perform operations such that each core of the multicore computing device operates under an operating system that is different from that of one or more of the other cores in the multicore computing device. In an aspect, the stored processor-executable software instructions may be configured to cause a processor to perform operations such that at least one core of the multicore computing device shares at least one resource that binds the core to operations of at least one other core, and each core is configured to enter and exit low power modes independent of each of the other cores. In an aspect, the multicore computing device may include an RPM processor for managing resources shared by two or more execution environments. In an aspect, the stored processor-executable software instructions may be configured to cause a processor to perform operations may further include determining which cores are asleep by accessing a variable shared between cores running threads and cores running idle threads, wherein the shared variable is incremented by each core upon the performance of an enter function of an idle thread and decremented by each core upon the performance of an exit function of the idle thread. In an aspect, the stored processor-executable software instructions may be configured to cause a processor to perform operations may further include using a spinlock to protect against one core starting an RPM transaction while another core sends another RPM transaction. In an aspect, the stored processor-executable software instructions may be configured to cause a processor to perform operations such that using a spinlock to protect against one core starting an RPM transaction while another core is sending an RPM transaction may include holding the spinlock during a RPM start operation and during a RPM stop operation. In an aspect, the stored processor-executable software instructions may be configured to cause a processor to perform operations such that each core in the multicore computing device writes to disjoint parts of a sleep set, and wherein using a spinlock to protect against one core starting an RPM transaction while another core is sending an RPM transaction may include releasing the spinlock when adding resources to the sleep set. In an aspect, the stored processor-executable software instructions may be configured to cause a processor to perform operations may further include marking a resource for auto-invalidate, and invalidating, in the RPM processor, a sleep set associated with the marked resource. In an aspect, the stored processor-executable software instructions may be configured to cause a processor to perform operations may further include invalidating a previous transaction such that resources from the previous transaction do not enter their sleep set undesirably. In an aspect, the stored processor-executable software instructions may be configured to cause a processor to perform operations such that each core in the multicore computing device has a subsystem power management (SPM) hardware block that controls the power state of that core and handshakes with the RPM processor when the core enters its low power mode, the method may further include detecting, in a RPM sleep driver, that a spinlock is currently being held, ignoring the transaction and not sending a sleep set transaction in response to detecting that the spinlock is currently being held, and not applying the sleep set on the RPM processor despite the SPM hardware block of each core performing a handshake with the RPM. In an aspect, the stored processor-executable software instructions may be configured to cause a processor to perform operations may further include receiving, in an RPM driver, a spinlock in active context, entering a sleep mode of a first core of the multicore computing device, initiating an idle process on a zeroth core of the multicore computing device while waiting for an RPM acknowledgment interrupt, solving, for sleep modes on the zeroth core and choosing a global low power mode for the zeroth core to enter, entering the global low power mode on the zeroth core, receiving the RPM acknowledgment interrupt on the zeroth core, and releasing the spinlock. In an aspect, the stored processor-executable software instructions may be configured to cause a processor to perform operations may further include initiating a sending of an RPM message on a zeroth core, receiving, in an RPM driver, an operating system lock, entering a sleep mode on a first core of the multicore computing device and building an RPM transaction, initiating a sending of a sleep set on the first core, receiving a sleep set transaction request on the RPM driver from the first core and checking to determine if the operating system lock is held, and ignoring sleep set transaction request and sending an interrupt signal to the first core if it is determined that the operating system lock is held.

Further aspects include a computing device having means for maintaining a reference count in memory for each low power resource shared by more than one core of the multicore computing device, means for independently adjusting a value stored in memory based on each core's power state and each core's usage of the low power resource associated with the memory location, and means for using the value at the memory location to determine when to enter a system low power configuration. In an aspect, the computing device may include means for identifying resources that may be placed in a low power mode based upon a flag bit setting, means for registering a latency requirement on a per-core or global basis, means for selecting a most stringent latency requirement from the registered latency requirements, means for evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core, selecting a combination of low power resource modes that maximizes potential power savings and has a total latency requirement that is less than or equal to the selected worst case latency requirement on the current core, and means for entering the selected combination of low power resource modes by executing an enter function of each of the selected low power modes on each of the identified resources. In an aspect, the computing device may include means for entering the selected combination of low power resource modes by executing an enter function of each of the selected low power modes on each of the identified resources may include means for executing the enter function when the reference count value equals zero, for shared modes. In an aspect the computing device may include means for determining potential power savings of each evaluated low power resource mode based upon a potential power savings per unit time at a current temperature times an expected idle time, for the idle time expected on the current core. In an aspect, the computing device may include means for operating each core of the multicore computing device under an operating system that is different from that of one or more of the other cores in the multicore computing device. In an aspect, the computing device may include means for configuring the computing device such that at least one core of the multicore computing device shares at least one resource that binds the core to operations of at least one other core, and such that each core is configured to enter and exit low power modes independent of each of the other cores. In an aspect, the computing device may include means for including an RPM processor for managing resources shared by two or more execution environments in the multicore computing device. In an aspect the computing device may include means for determining which cores are asleep by accessing a variable shared between cores running threads and cores running idle threads, wherein the shared variable is incremented by each core upon the performance of an enter function of an idle thread and decremented by each core upon the performance of an exit function of the idle thread. In an aspect the computing device may include means for using a spinlock to protect against one core starting an RPM transaction while another core sends another RPM transaction. In an aspect, means for using a spinlock to protect against one core starting an RPM transaction while another core is sending an RPM transaction may include means for holding the spinlock during an RPM start operation and during an RPM stop operation. In an aspect, each core in the multicore computing device writes to disjoint parts of a sleep set, and wherein means for using a spinlock to protect against one core starting an RPM transaction while another core is sending an RPM transaction may include means for releasing the spinlock when adding resources to the sleep set. In an aspect, the computing device may include means for marking a resource for auto-invalidate and means for invalidating, in the RPM processor, a sleep set associated with the marked resource. In an aspect, the computing device may include means for invalidating a previous transaction such that resources from the previous transaction do not enter their sleep set undesirably. In an aspect, each core in the multicore computing device may have a subsystem power management (SPM) hardware block that controls the power state of that core and handshakes with the RPM processor when the core enters its low power mode, the device may further include means for detecting, in an RPM sleep driver, that a spinlock is currently being held, means for ignoring the transaction and not sending a sleep set transaction in response to detecting that the spinlock is currently being held, and means for not applying the sleep set on the RPM processor despite the SPM hardware block of each core performing a handshake with the RPM. In an aspect, the computing device may include means for receiving, in an RPM driver, a spinlock in active context, means for entering a sleep mode of a first core of the multicore computing device, means for initiating an idle process on a zeroth core of the multicore computing device while waiting for an RPM acknowledgment interrupt, means for solving for sleep modes on the zeroth core and choosing a global low power mode for the zeroth core to enter, means for entering the global low power mode on the zeroth core, means for receiving the RPM acknowledgment interrupt on the zeroth core, and means for releasing the spinlock. In an aspect, the computing device may include means for initiating a sending of an RPM message on a zeroth core, means for receiving, in an RPM driver, an operating system lock, means for entering a sleep mode on a first core of the multicore computing device and building an RPM transaction, means for initiating a sending of a sleep set on the first core, means for receiving a sleep set transaction request on the RPM driver from the first core and checking to determine if the operating system lock is held, and means for ignoring sleep set transaction request and sending an interrupt signal to the first core if it is determined that the operating system lock is held.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
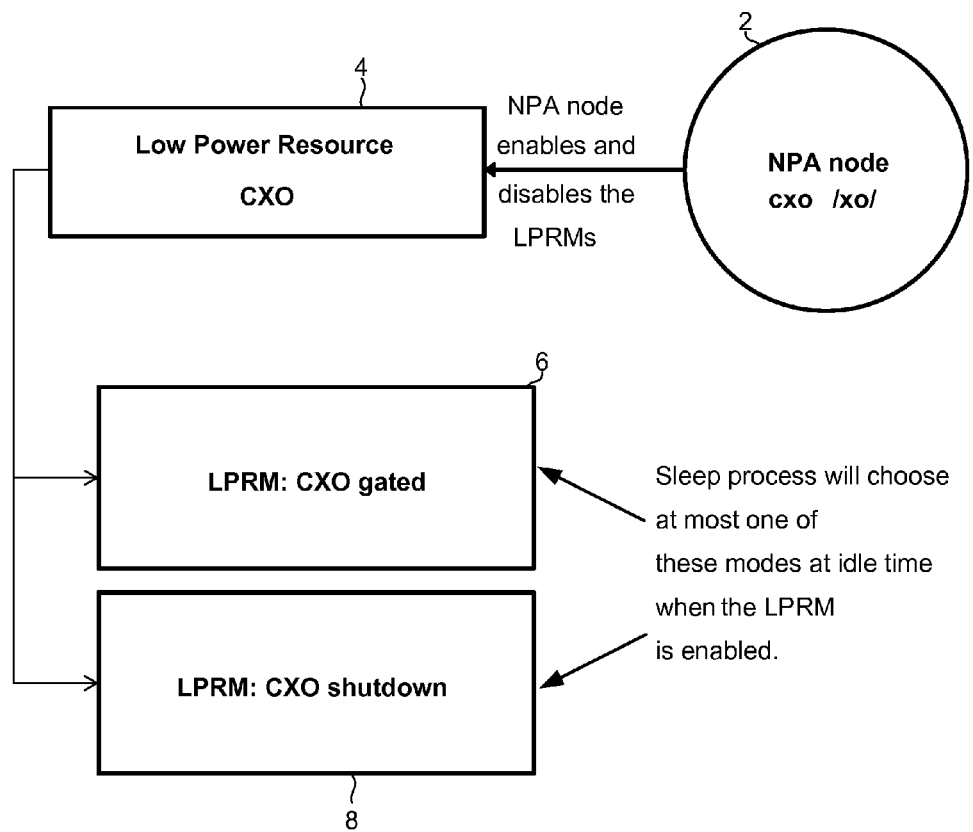
FIG. 1 is a diagram of a resource controlled by a programming node to enter one of two low power modes in an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "computing device" are used interchangeably herein to refer to any one or all of cellular telephones, laptop computers, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and operate under battery power such that power conservation methods are of benefit.

The term "system on chip" (SOC) is used herein to refer to a single integrated circuit (IC) chip that contains multiple resources and processors integrated on a single substrate. A single SOC may contain circuitry for digital, analog, mixed-signal, and radio-frequency functions. A single SOC may also include any number of general purpose and/or specialized processors (DSP, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. A SOC may include multiple multicore processors, and each processor in an SOC may be referred to as a core.

The term "resource" is used herein to refer to any of a wide variety of circuits (e.g., ports, clocks, buses, oscillators, etc.), components (e.g., memory), signals (e.g., clock signals), and voltages (e.g., voltage rails) which are used to support processors and clients running on a computing device. A mobile computing device typically may include a number of resources, such as a crystal oscillator, voltage rails, one or more memory units, communication busses, etc.

Resources in multicore processor systems and SOCs may be local to a particular core, shared among a subset of the cores, or shared among all cores. As used herein, the term "global resource" refers to a resource that is shared among all cores of a device, chip, processor, group, etc.

For the sake of clarity, various aspect methods are described using node power architecture (NPA) and related terminology. However, it should be understood that the examples related to NPA nodes and other references to an NPA node or NPA methods herein are for illustration purposes only. Therefore the scope of the claims should not be construed as requiring an NPA node or NPA process unless specifically so recited in the claims.

To maximize battery life, mobile devices may be configured to place one or more device resources in a low power state whenever possible, such as when the processor is in an idle state. Placing a device resource in a low power state typically consists of de-energizing or reducing the operations of the resource whenever the processor is not actively processing tasks. Certain resources are essential for proper operation and/or are used by other components and cannot be turned off or placed in a low power state when the processor is idle. For clarity, resources that can be turned off or placed in one or more low power states when the processor is not processing tasks and/or is in an idle state are referred to herein as low power resources (LPRs). Multiple LPRs can be activated, enabled, deactivated, and/or disabled in a given idle state. Each LPR may have multiple low power modes (idle, active-sleep, sleep, deep-sleep, etc.), which are referred to herein as low power resource modes (LPRMs). Each resource may define LPRM characteristic data that includes information used by the processor in selecting an optimum set of LPRMs for a given state. This information may include a listing of each LPRM available for the resource, potential power savings for each LPRM as a function of time or per unit time, latency characteristics for each LPRM (i.e., time to exit the low power mode), temperature effects on potential power savings, dependencies (i.e., interdependencies with other resources that clients), and other information that may be relevant to selecting an optimum LPRM for each resource.

An overall "system low power configuration" is a set of a low power modes selected for each of the resources available for entering a low power mode based upon the current operating state and conditions.

Methods and systems for dynamically computing and selecting low power modes are disclosed in U.S. patent application Ser. No. 12/965,008 filed Dec. 10, 2010 entitled "Dynamic Low Power Mode Implementation For Computing Devices," the entire contents of which are hereby incorporated by reference. Briefly, a device may select one or more low power resource modes (LPRMs) by identifying resources that can be disabled as well as the resources that should remain on during a device low power configuration. A device processor may compute an optimal system low power configuration (which is made up of a set of low power resource modes), by determining which of the resource's low power resource modes are valid at the time the processor enters an idle state, ranking the valid low power resource modes by expected power savings given the current device conditions, determining which of the valid low power resource modes provide the greatest power savings while meeting the latency requirements, and selecting a particular low power resource mode for each resource to enter.

Resources may indicate when they are available to enter a low power state by enabling a flag bit within a low power mode mask ("LPM mask"). When the processor is ready to enter a system low power mode, a low power task may access the LPM mask to identify the resources which can be placed in a low power state and determine the appropriate LPRMs to enter for those resources based upon a given dynamic system state (e.g., currently active clients, required latency, expected idle time, and temperature).

In an aspect, when the processor is able to enter an idle state, a low power task may run a "solver" process to determine which low power modes for the various resources should be entered. In such cases, the low power modes and the characteristics of those low power modes for the different resources may need to be collected for use by a sleep task to be evaluated when it is time to enter the idle state. This may be implemented in a node power architecture (NPA) through a "/sleep/lpr" NPA node.

Requests to "/sleep/lpr" may be made in the form of bitmasks that enable low power resource modes. Developers may register a low power resource mode via a sleep_define_lpr( ) function that enrolls the low power resource mode (and its resource low power mode bitmasks) with the "/sleep/lpr" NPA node. The "/sleep/lpr" NPA node may be queried at any time for the bitmask that represents the resource low power resource modes they are interested in enabling/disabling. NPA resources can also request that their resource low power resource modes be enabled at idle time by making a request into "/sleep/lpr" with the right bitmask. The sleep solver can then query "/sleep/lpr" at idle time for the list of low power resource modes and the mask of which ones are currently enabled.

As discussed above, when a processor is able to enter an idle state, a low power task may run a "solver" process to determine which low power resource modes for the various resources should be entered. An example of this is illustrated in FIG. 1 which illustrates how a process (i.e., node) within a node power architecture (NPA) 2 determines for a resource (crystal oscillator 4), which of the available low power modes 6, 8 can be entered. In the example illustrated in FIG. 1, the crystal oscillator resource 4 has two alternative low power resource modes (LPRMs), namely a gated operating state 6 and complete shutdown 8. The selected LPRMs may be entered by calling an "enter" function, which places the resource in a power savings state. While the processor is idle, the processor may perform a wait for interrupt (WFI) process and/or idle process. The processor and selected resources may remain in this state until a wakeup event occurs. When a wake-up event occurs, an "exit" function may be called for each selected resource to return that resource to the desired operating state (e.g., a normal or full power state).

While the above mentioned process for dynamically computing and selecting low power modes is effective for traditional computing devices, modern mobile devices are becoming ever more complex and the number of resources used or managed by device processors is increasing every year. For example, many mobile computing devices now include multiple crystal oscillators, multiple voltage rails, and multiple memory locations, each of which can be controlled independently. Consequently, there are many different resources that a mobile device processor may turn off or place in a low power mode in order to conserve power. Moreover, modern mobile devices may have multiple processors/core using the various device resources and performing different tasks (and thus may not be idle at the same time). The existence of multiple processors/cores adds an additional level of complexity to the management of the low power modes, and a degree of executive control must be exercised when selecting resources to be placed in a low power mode.

Generally, choosing which resources to place in the various low power modes is known as the "sleep problem." For example, if the power required to power down and return a resource to its required operating state is greater than the power saved by having the resource in a low power mode for the estimated duration of the processor idle state, then the battery life of the mobile device may not be maximized by simply turning the resource off and/or placing it in a low power state whenever the processor is idle. Thus, determining which resources should be turned off and/or placed in low power modes (and which low power mode should be selected for that resource) typically requires analysis of the processor state, states of other device processors, and other factors, such as latency, power saving potential, power consumption, and interdependencies of the resources/processors.

Figure 2:
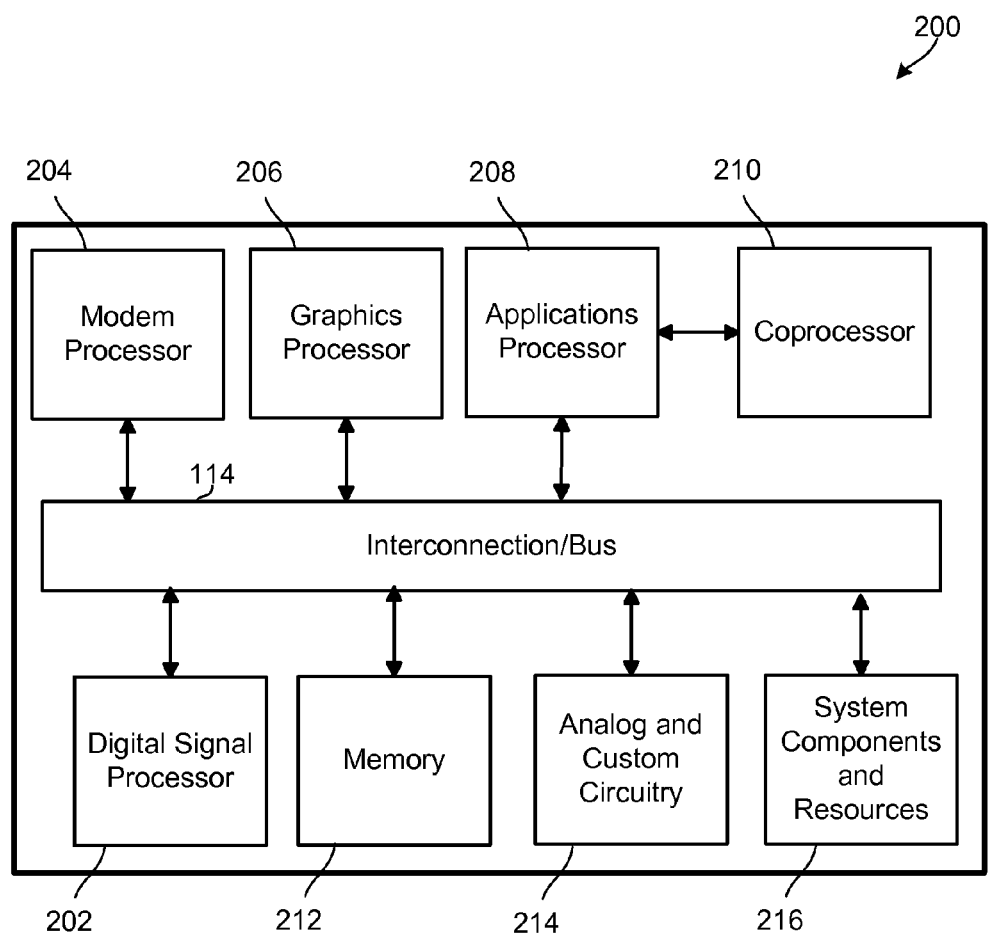
FIG. 2 is an architectural diagram of an example system on chip suitable for implementing the various aspects.

FIG. 2 is an architectural diagram illustrating an example system-on-chip (SOC) 200 architecture that may be used to implement the various aspects. The SOC 200 may include a number of heterogeneous processors, such as a digital signal processor (DSP) 202, a modem processor 204, a graphics processor 206, and an application processor 208, each of which may include one or more cores. The SOC may also include one or more coprocessors (e.g., vector co-processor) 210 connected to one or more of the processors. Each processor may include one or more cores, and each processor/core may perform operations independent of the other processors/cores. For example, the SOC 200 may include a processor that executes a UNIX based operating system (e.g., FreeBSD, LINUX, OS X, etc.) and processor that executes a windows-based operating system (e.g., Microsoft Windows 7).

The SOC 200 may also include analog circuitry and custom circuitry 214 for managing sensor data, analog-to-digital conversions, wireless data transmissions, and performing other specialized operations, such as processing encoded audio signals for games and movies. The SOC may further include system components and resources 216, such as voltage regulators, oscillators, phase-locked loops, peripheral bridges, data controllers, memory controllers, system controllers, access ports, timers, and other similar components used to support the processors, and clients running on a computing device.

The system components 216 and custom circuitry 214 may include circuitry to interface with peripheral devices, such as cameras, electronic displays, wireless communication units, external memory chips, etc. The processors 202, 204, 206, 208 may be interconnected to one or more memory elements 212, system components, and resources 216 and custom circuitry 214 via an interconnection/bus module, which may include an array of reconfigurable logic gates and/or implement a bus architecture (e.g., CoreConnect, AMBA, etc.).

Figure 3:
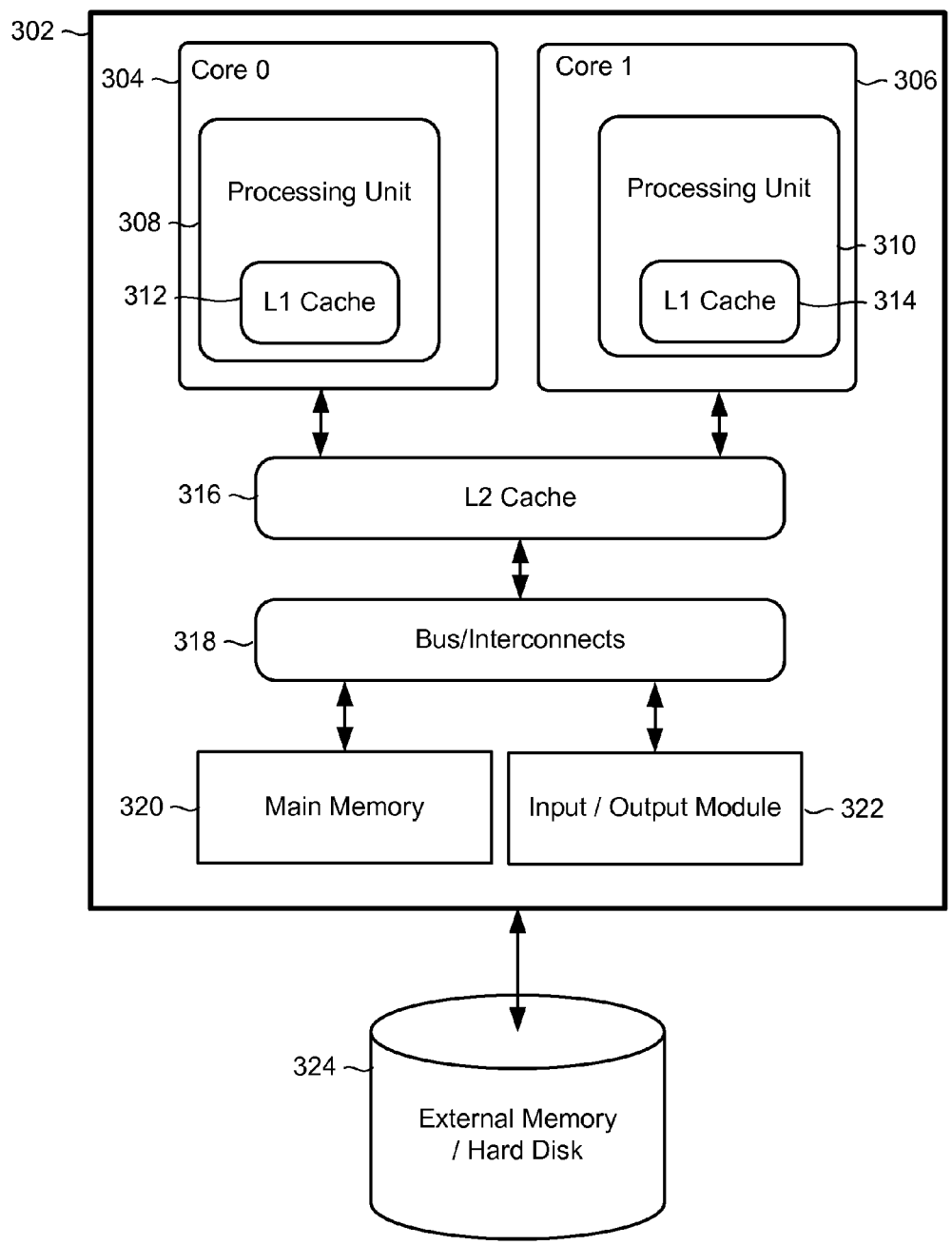
FIG. 3 is an architectural diagram of an example multicore processor suitable for implementing the various aspects.

FIG. 3 is an architectural diagram illustrating an example multicore processor architecture that may be used to implement the various aspects. As mentioned above, a multicore processor 302 may include two or more independent processing cores 304, 306 in close proximity (e.g., on a single substrate, die, integrated chip, etc.). The proximity of the processors/cores allows memory to operate at a much higher frequency/clock-rate than is possible if the signals have to travel off-chip. Moreover, the proximity of the cores allows for the sharing of on chip memory and resources, as well as for more coordinated cooperation between cores.

The multicore processor 302 may include a multi-level cache that includes Level 1 (L1) caches 312, 314 and a Level 2 (L2) cache 316. The multicore processor 302 may also include a bus/interconnect interface 318, a main memory 320, and an input/output module 322. The L2 cache 316 may be larger (and slower) than the L1 caches 312, 314, but smaller (and substantially faster) than a main memory unit 320. Each processing core 304, 306 may include a processing unit 308, 310 that has private access to an L1 cache 312, 314 and shared access to the L2 cache 316. The L1 and L2 caches 312, 314 may be used to store data frequently accessed by the processing units 308, 310. The main memory 320 may be used to store larger files and data units being accessed by the processing cores 304, 306.

The multicore processor 302 may be configured such that the processing cores 304, 306 seek data from memory in order, first querying the L1 cache, then L2 cache, and then the main memory if the information is not stored in the caches. If the information is not stored in the caches or the main memory 320, multicore processor 302 may seek information from an external memory/hard disk 324.

The processing cores 304, 306 may be identical to one another, heterogeneous and/or implement different functions. Thus, processing cores 304, 306 cores need not be symmetric, either from the operating system perspective (e.g., may execute different operating systems) or from the hardware perspective (e.g., may implement different instruction sets/architectures).

The processing cores 304, 306 may communicate with each other via a bus/interconnect 318. Each processing core 304, 306 may have exclusive control over some resources and share other resources with the other cores. The inclusion of multiple cores on a single chip, and the sharing of memory and resources between cores, gives rise to a number power and temperature management issues that complicate solutions to the sleep problem and the selection of an optimal low power resource configuration.

As discussed above, to conserve battery life, each resource may have a set of low power modes (LPRMs) into which the resource can be placed. In SOCs and multicore processor systems, each of the processing units/cores may be operating under a different operating system and the cores may have different sets of constraints, workloads, and different times they are expected to enter and exit a low power/sleep mode (i.e., each core may be required to enter and exit sleep mode independently). Each of the processing units/cores may also share resources that bind them to the operations/states of the other cores. For example, a multi-core processor/SOC may have four cores that can theoretically enter a low power/sleep mode independently, but are bound to the operations of root crystal oscillator that cannot be shut down unless all the cores are in a low power mode. This requires a lot of explicit handshaking, locking, or direct signaling between the cores before they can enter and/or exit a low power mode. These factors complicate the selection of an optimal low power resource configuration in systems that include SOCs and/or multicore processors.

Existing multicore/SOC sleep implementations do not scale well and do not allow for the selection of an optimal overall low power resource mode configuration. As mentioned above, the cores/processing units have to perform complex lock and synchronize operations before the system can enter a global low power mode, and significant bottlenecks arise as the number of cores/processing units increase (8, 16, 32, etc.). Moreover, existing solutions for managing the processor/core idle states in a multi-core processor system typically depend on the type of operating system used. For example, some operating systems (e.g., LINUX, etc.) may be configured to control multi-core sleep operations via a process that resides above the sleep process and turns off the other cores/resources explicitly (outside of the sleep process) such that when they want to do the final sleep (e.g., all cores in sleep mode), all operations are routed down to the zero core. This in effect allows the multi-core systems to manage resources/multiple cores in a manner that is similar to a single core solution (the zero core is responsible for all the others).

Other operating systems (e.g., Microsoft Windows, etc.) may be configured such that, when the different cores get ready to enter a sleep mode, they block and wait for the last core to go down. This solution results in the cores running in a lower power state, but not the lowest system power state, until all the global resources and cores are idle.

The various aspects do not require the zero core to monitor the others, do not require a process that resides above the sleep process to monitor the cores (e.g., LINUX, etc.), and do not require the cores to block and wait until all the global resources are idle. Unlike existing solutions, the various aspects allow all the cores/processing units in a multicore processor/SOC to be treated in a symmetric fashion. Each core may choose its operating state independent of the other cores by monitoring a reference count.

As mentioned above, in a SOC/multicore processor, each processor/core may be operating under a different operating system, and each core/processor may have different sets of constraints, workloads, and different times they are expected to enter and exit a low power/sleep mode (i.e., each core may be required to enter and exit sleep mode independently), and at the same time, share resources that bind them to the operations/states of the other cores. Thus, when dynamic sleep operations are performed in a multicore environment, special considerations must be taken in order to share data between the various cores and to coordinate putting shared resources in their low power modes, which typically requires explicit handshaking, locking or direct signaling between the cores before they can enter and/or exit a low power mode. The various aspects revise the way in which the cores select low-power modes, identify resources that can be disabled, and identify resources that should remain on during a device low-power configuration. The various aspects also allow multicore systems to perform these operations efficiently by setting constraints either locally (i.e., for a specific core) or globally (i.e., for all cores) in a manner that allows discrete resources to be handled discreetly and global resources to be shared across the cores, all without requiring any explicit handshaking, locking or direct signaling between the cores before entering a system low power mode.

Figure 4:
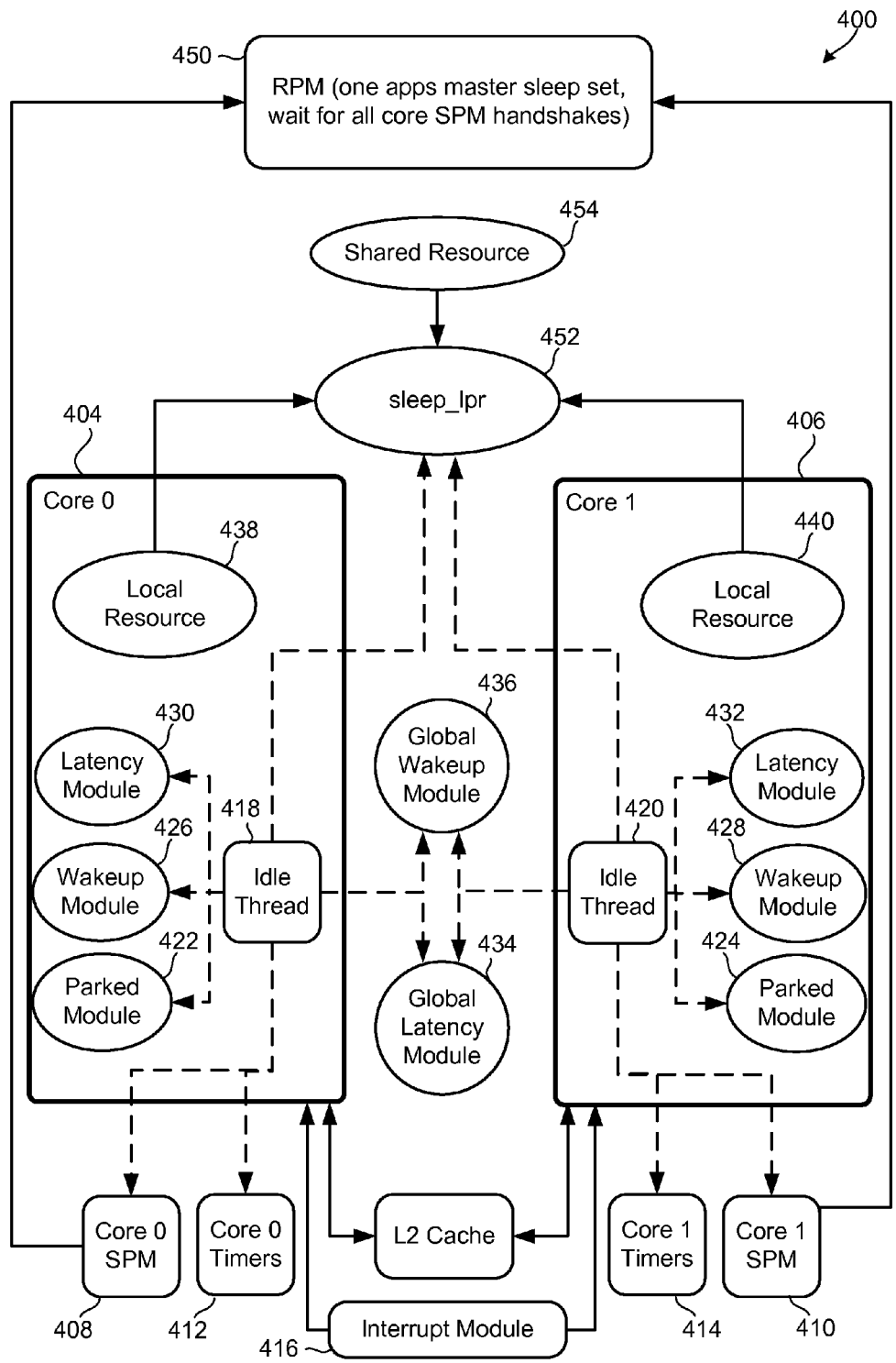
FIG. 4 is an architectural diagram illustrating the various global and local components in a multicore processor configured to implement the various aspects

FIG. 4 is a component flow diagram illustrating example flows in a multicore processor system 400 implemented in accordance with the various aspects. The multicore processor system 400 may include two or more independent processing cores 404, 406, each of which may be placed in a sleep/low power mode independent of the other cores. The multicore processor system 400 may also include an interrupt module 416 configured to fire interrupts on one or more of the cores 404, 406, which may cause the cores to wake up from a sleep state/low power mode.

The multicore processor system 400 may also include a number of resources 438, 440, 452. Some resources (e.g., local resource 438, 440) may be controlled on a per-core basis and are considered local to each core (i.e., power collapse of the core rail). Other resources (e.g., shared resource 454) may be shared by one or more cores and require coordination between all cores before entering their LPRMs.

Each processor core 404, 406 may have a core timer 412, 414 and a subsystem power management (SPM) hardware block 408, 410. The SPM hardware blocks 408, 410 may control the power states of their respective cores such that the core may enter a low power mode while maintaining the capability to quickly restart processing operations.

Each core 404, 406 may execute an idle thread 418, 420 that runs independent of the other cores. The idle threads 418, 420 may communicate with their respective core timers 412, 414 and subsystem power management (SPM) hardware blocks 408, 410. Each idle thread 418, 420 may also communicate with a local latency module 430, 432, a local wakeup module 426, 428 and/or a local parked module 422, 424 of their respective cores 404, 406, and with a global wakeup module 436 and global latency module 434 that are shared between cores. In an aspect, the latency modules 430, 432, 434, wakeup modules 426, 428, 436, and parked modules 422, 424 may be nodes in node power architecture (NPA) implementation.

Client applications may register with the local latency nodes 430, 432 to cause a specific core to honor a latency constraint. Client applications may register with a global latency module 434 if they do not know which core their interrupt will fire on. In an aspect, interrupt latency may be calculated as the amount of time between the firing of an interrupt to the time the interrupt service routine (ISR) is executed.

In an aspect, the multicore processor system 400 may include a resource power manager (RPM) 450 processor for managing resources that are shared by more than one execution environment (or "master") in the system.

In an aspect, a resource power manager (RPM) 450 may wait for handshakes from each core's subsystem power management (SPM) hardware blocks 408, 410 before honoring sleep requests.

The wakeup modules 426, 428, 436 may be configured to enable client applications to provide input to the sleep subsystem about expected wakeup interrupts that are not scheduled through the timer subsystem. This may allow a sleep process to optimize the choice of low power modes with knowledge of when an interrupt is expected to fire and wake the system up. Client applications may register with local wakeup modules 426, 428 to indicate a wakeup event on a specific core. Client applications may register with global wakeup module 436 if they do not know which core their interrupt will fire on.

Each core 404, 406 may be configured to independently determine whether to honor local and/or global wakeup inputs and/or latency constraints, which the cores may determine based on the presence and/or state of parked module 422, 424 resources.

In an aspect, the parked modules 422, 424 may include a node power architecture (NPA) resource on each respective core that allows an operating system (or a MP-DCVS subsystem) to indicate whether a core is "active" or "parked."

The active state may indicate that an operating system is actively scheduling threads on the core, and that both local and global latency, and wakeup constraints should be honored.

The parked state may indicate that an operating system is not actively scheduling threads on the core, and that only local latency and wakeup restrictions are to be honored (i.e., global latency and wakeup constraints may be ignored).

In an aspect, the multicore processor system 400 may be configured such that, when a core is in the active state, the operating system honors both local and global latency and/or wakeup restrictions, and when a core is in the parked state, the operating system honors only the local latency and wakeup restrictions.

In an aspect, an operating system may be configured to route all interrupts to an individual core (e.g., core 0), and the multicore processor system may be configured such that only the individual core (i.e., core 0) honors the global wakeup/latency constraints. In such aspects, the global wakeup/latency module may be aliased to the core's (core 0's) local wakeup/latency module (e.g., wakeup module 426, latency module 430).

In an aspect, the absence of a parked module (e.g., module 422, 424) in a core causes that core to operate in an active state.

In an aspect, the parked modules 422, 424 may be in an active state by default.

In an aspect, the parked modules 422, 424 may be configured to identify a third state (e.g., idle state) that indicates that the operating system is not actively scheduling threads on the core, but that interrupts may be routed to the core that correspond to the registered latency and wakeup constraints, which the core should honor. For example, an operating system executing on a core may define the "parked state" such that the core can have interrupts routed to it when parked (i.e., not scheduling threads on the core). In such cases, an interrupt subsystem (e.g., interrupt module 416) may be configured to notify the parked modules 422, 424 that the core is in an idle state and that the core should honor global latency and wakeup constraints.

In the various aspects, there may be a known wake up event that is associated with a timer sub-system that gets queried directly. The various aspects may also include a wake resource that allows clients to "hint" that they believe a wake up event will occur in a certain amount of time.

In various aspects, the system may include mechanisms that predict and/or control how long the resources and/or cores are likely to remain in a given sleep state. In these aspects, the processor may postpone certain events to control how long the resources can expect to be asleep. In various aspects, there may be a hard wake up point at which the resources are forced to wake up. In various aspects, the system may use the "hints" from the resources to determine an expected wake up time frame.

Various aspects may implement predictive algorithms that may be used by the processor to estimate the most efficient wake up time.

Various aspects may use a combination of a hard limit, hints, and learning mechanisms to determine an expected wake up time.

Various aspects may use the expected wake up time to determine how much power would be saved if resources are placed in low power resource modes until the determined expected wake up time. Such expected power savings may then be used in the process of selecting particular resources to place in a low power mode (i.e., selecting low power resource modes) to implement in a system low power mode configuration for an impending sleep cycle.

In an aspect, the wakeup modules 426, 428, 436 may be queried to identify the amount of time remaining until the next scheduled wakeup (e.g., duration until a "hard wakeup"). The global wakeup module 436 may return the duration for the core making the request, and the core-specific wakeup modules 426, 428 may return the duration for the core that they represent.

In an aspect, instead of querying for a scheduled wakeup (e.g., hard wakeup) through the wakeup node, the scheduled wakeup information may be passed to a sleep task for processing. For example, a high-level operating system (HLOS) may pass a hard-wakeup duration for the specific core that is idle to a sleep task for processing.

In an aspect, the sleep subsystem may include a library shared by all the cores. Multiple cores may simultaneously read and/or modify shared data (e.g., sleep subsystem library), either within the context of the idle thread or within the context of another thread.

As mentioned above, some resources used by the processor may be controlled on a per-core basis and are thus local to each core (i.e., power collapse of the core rail), while other resources may be shared by one or more cores. Since resources may be global (e.g., shared by more than one core), coordination between the cores may be required for the core enter a sleep mode or before resources are allowed to enter their low power modes. In an aspect, the multicore processor system 400 may include dynamic sleep framework that provides coordination between cores and assists in the selection of low power modes for each core. The dynamic sleep framework may identify the core(s) to which each low power resource (LPR) applies.

A field may be added to the sleep structure 452 that identifies the relationship between specific cores and low power resources. A resource may be local, shared among a subset of cores, or shared among all cores (global). For example, if a resource applies to more than one core (i.e., the LPRM is global), the cores may access a reference count stored in a shared memory to determine if the resource/core may be placed in a low power mode. If a resource applies only to a specific core (i.e., the LPRM is local), then the core to which the resource applies may put that resource into its low power mode without need for a reference count.

In order to choose a sleep set for a specific core, the dynamic sleep framework may be made aware of which core(s) a particular LPR applies to. This may be accomplished by querying the added field of the sleep_lpr node 452 to identify specific cores to which an LPR applies to. The added field may include a number of bits, each bit corresponding to a specific core (i.e., bit zero may correspond to core 0, bit 1 to core 1, etc.). If any of the bits are set, then the LPR may be identified as applying only to cores identified by the set bits. If no bits are set, or if all bits are set, then the LPR may be treated as being shared amongst all the cores (i.e., LPR is global).

In an aspect, the sleep sub-system may create synthesized modes, which represent the valid combinations of component modes that are registered with the sleep subsystem. Synthesized modes may be created based on dependency, latency, ordering, and power savings information given in the component modes.

In an aspect, each core may include an enabled list that gets pruned on the fly by the sleep framework as LPRMs get enabled and disabled. Whenever a certain core goes idle, and requests the enabled modes list, a sleep registry may return the list for the requesting core. For example, if the following LPRMs are present in the system:

| Core 0 | Core 1 | Global |
| --- | --- | --- |
| cpu_vdd0.off | cpu_vdd1.off | cxo.shutdown |
| | | pxo.shutdown |

The synthesized modes list for each core may be (dependencies implied):

| Core 0 | Core 1 |
| --- | --- |
| cpu_vdd0.off + cxo.shutdown + pxo.shutdown | cpu_vdd1.off + cxo.shutdown + pxo.shutdown |
| cpu_vdd0.off + cxo.shutdown | cpu_vdd1.off + cxo.shutdown |
| cpu_vdd0.off + pxo.shutdown | cpu_vdd1.off + pxo.shutdown |
| cpu_vdd0.off | cpu_vdd1.off |

It should be noted that synthesized modes are not required as part of the various aspects, and therefore this description of synthesized modes should not limit the scope of the claims in any way unless specifically recited by the claims.

As each of the LPRMs get enabled or disabled, the sleep registry may prune the enabled list for each core so that the enabled list always reflects the current list of enabled modes for that core. For example, if cpu_vdd0.off is disabled for core 0, cpu_vdd1.off may still be entered by core 1, and the sleep registry may prune the enabled list for each core to reflect this modes.

In an aspect, when all of the component modes in the synthesized mode are enabled, the entire synthesized mode may be enabled and made a candidate for sleep.

In an aspect, if the solver chooses a local (non-shared) LPRM for entry, the LPRM may be entered without coordination with other cores and the enter functions for local LPRMs may be executed unconditionally.

Figure 5:
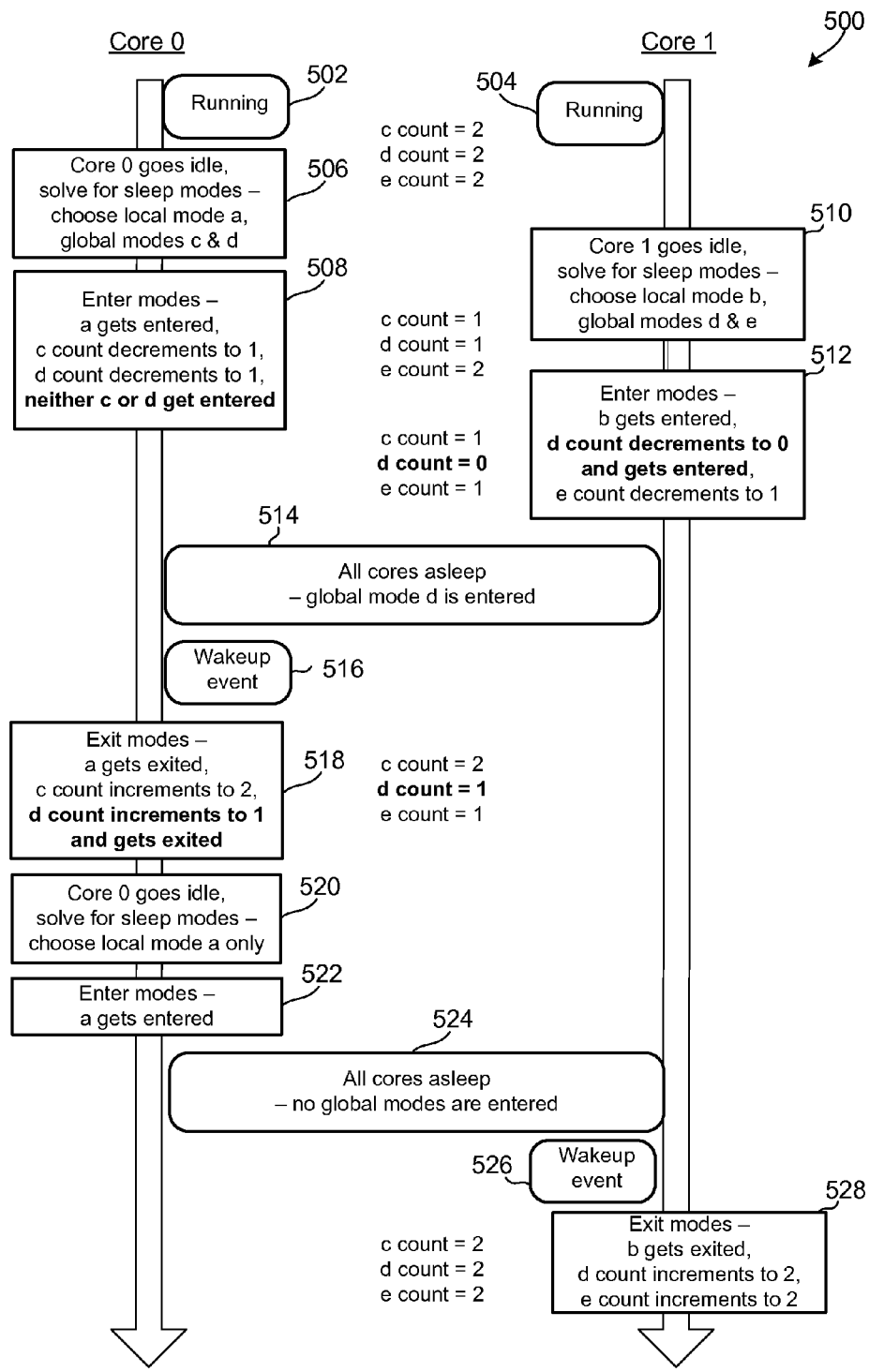
FIGS. 5-9 are process flow diagrams of aspect methods for performing multicore sleep and selecting an optimum set of low power modes.

FIG. 5 illustrates an aspect method 500 which may be implemented by a multicore processor system to coordinate the "enter" and "exit" functions of the different cores, and to identify and enter a system low power configuration. The multicore processor system may include one or more memory locations associated with a resource low power resource mode (LPRM), used for reference counting for shared modes. As discussed above, resources used by a multicore processor system may be local (controlled on a per-core basis) or shared (used by more than one core). In the illustrated example of FIG. 5, LPRM a is local to core 0, LPRM b is local to core 1, and LPRMs c, d, and e are shared by all cores.

In blocks 502 and 504, core 0 and core 1 of the multicore processor are running and using/driving local and global resources. In block 506, core 0 may enter an idle state and initiate the execution of a solver process to "solve" for the sleep modes. As discussed above, when a processor is ready to enter a system low power mode, such as when a core is in idle state, a low power task (e.g., a "solver" task/process) may access low power mode masks to identify the resources which can be placed in a low power state and determine the appropriate low power resource modes to enter for those resources based upon a given dynamic system state (e.g., currently active clients, required latency, expected idle time, and temperature). That is, when a core is able to enter an idle state, a low power task may run a "solver" process to determine which low power modes for the various resources should be entered. Moreover, in order to allow any core to be the first to go down and any core to be the last to come up, each core may "solve" for the entire set of modes that it can enter, both locally and globally. For example, in block 506, core 0 may perform operations that identify modes a, c, and d as available low power modes, and choose local mode a, and global modes c and d.

For every mode that is chosen, the enter function and exit function for the mode may be called. In an aspect, for modes that are shared among cores (e.g., LPRMs c, d, and e), the contents of the enter function and the exit function may be executed only when every core that shares that mode has chosen it for entry. This may be accomplished by keeping a count associated with each LPRM that represents how many times that LPRM has been entered and exited. The count may start at the number of running cores that share the LPRM. In the illustrated example of FIG. 5, the multicore processor includes two cores (core 0, core 1), and thus, each of the global LPRMs c, d, and e have an initial value of two (mode c=2, mode d=2, mode e=2). Each time an LPRM enter function is called, the count may be decremented atomically. For example, in block 508, core 0 may decrement the values associated with global LPRM c (e.g., LPRM c decrements to 1) and global LPRM d (e.g., mode d decrements to 1). When the count on global LPRM memory location reaches zero, the enter function for that LPRM may be executed. Likewise, when a core wakes up, it calls the LPRM exit function, and the count may be incremented atomically. The exit function may begin the execution of the contents (e.g., exit tasks) when the count transitions from zero to one.

In an aspect, a sleep task may execute enter and exit functions on every core that chooses the LPRM. The count manipulation and decision for whether to execute the enter function and the exit functions may be controlled by an LPRM, in an aspect, an owner of the LPRM may coordinate the entry and exit of that LPRM between the cores. The LPRM may spinlock, or use other mechanisms for coordinating between cores, depending on the requirements of the LPRM.

In an aspect, if a solver task chooses a local (non-shared) LPRM for entry, the multicore processor system may assume that that LPRM can be entered without coordination with other cores, and the enter functions for local LPRMs may be executed unconditionally. For example, in block 508, local LPRM a may be entered without coordination with core 1. However, global LPRMs c are d are not entered in block 508 because the memory locations corresponding to global LPRMs c and d contain non-zero values (mode c memory=1, mode d memory=1).

In block 510, core 1 may go idle and perform operations that identify LPRMs b, d, and e as available low power modes. Also in block 510, core 1 may "solve for" the entire set of modes that it can enter, both locally (e.g., LPRM b) and globally (e.g., LPRMs d and e). As discussed above, solving for the entire set of modes that can be entered allows any core to be the first to go down and any core to be the last to come up.

In block 512, core 1 may enter the local LPRM b, decrement the value of global LPRM d (e.g., LPRM d decrements to zero) and decrement the value of global LPRM e (e.g., LPRM e decrements to 1). As mentioned above, by keeping a count associated with each global LPRM (e.g., LPRMs c, d, and e) that represents how many times that LPRM has been entered and exited, the multicore processor system may ensure that the contents of the enter function and the exit function are executed only when every core that shares that mode has chosen it for entry.

In block 514, both core 0 and core 1 may enter a sleep mode and send a sleep set. Since the memory location corresponding to global mode d contains a zero value, global LPRM d may be entered in block 512.

In block 516, core 0 may detect a wake up event (e.g., an interrupt). In block 518, core 0 may exit the sleep modes by exiting local LPRM a, and incrementing the value of the memory location corresponding to global LPRMs c and d (e.g., LPRM c increments to 2, LPRM d increments to 1). Since the value of the memory location corresponding to LPRM d no longer contains a zero value (LPRM d=1), core 0 may also execute the contents of the exit function of global LPRM d.

As mentioned above, the various aspects enable global LPRMs to be entered by one core (e.g., core 1) and exited by another core (e.g., core 0). It should be noted that LPRM d was entered by core 1 (in block 512) and exited by core 0 (in block 518).

In block 520, core 0 may again go idle, "solve for" local LPRM a, and enter local LPRM a (e.g., initiate the execution of the enter function of local LPRM a) without coordination with core 1. In block 522, core 0 may enter a sleep mode and send the sleep set such that none of the global modes (e.g., modes c, d, and e) are entered.

In block 526, a wake up event may be detected on core 1 (e.g., an interrupt detected on core 1). In block 528, the multicore processor may exit the sleep modes by exiting local mode b, and incrementing the values of memory locations corresponding to global modes d and e (e.g., mode d increments to 2, e.g., mode e increments to 2).

In various aspects, the multicore processor system may be configured to honor constraints. That is, when a core goes idle and chooses its low power modes, there are certain constraints that must be met in order for the idle processing to be transparent to the rest of the system. These constraints may be gathered at run-time, and fed into the sleep code when the core goes idle. At any particular point, one core may be going idle with a certain set of constraints, while another core is awake and running a thread that modifies those constraints.

In some cases, the constraints may be modified in such a way that cores that are asleep have entered a set of modes that is now non-optimal for the new constraints, such as if the latency budget increases or an LPRM is enabled. In this case, the sleeping cores may be woken up as an optimization. In other cases, the constraints may be modified such that the cores that are asleep have entered a set of modes that violate the new constraints, such as if the latency budget decreases, or an LPRM is disabled. In this case, the sleeping cores may be woken up in order to obtain correct system behavior.

In order to determine which cores are asleep, a variable for each core which indicates whether the core is asleep may be shared between the threads that are running and the threads that are idle. This variable may be incremented by that core when it enters an idle thread, and decremented when it exits an idle thread.

In an aspect, shared data may be protected based on the type of data stored and/or the manner in which the data is accessed. The multicore processor system may implement spinlocks, operating system (OS) locks, or processor-specific atomic instructions that protect and synchronize access to the data. The multicore processor system may also perform operations such that threads reading shared data do so in a wait-free manner and synchronization is only necessary when modifying the data.

As discussed above with reference to FIG. 4, in an aspect, the multicore processor system may include a resource power manager (RPM) processor for managing resources that are shared by more than one execution environment (or "master") in the system. Each master may create a "sleep set" for resources that the master would like to put into their low power modes. The sleep set may include a transaction that contains multiple RPM-managed resources, and desired state values for each resource. On the RPM, this may translate into a "vote" for that master. In an aspect, only the aggregated state of all master votes is the final state that is honored for the resource. The multicore environment may have an RPM sleep driver that is called only by the sleep code, and the process that sleep runs in. The system may also include an RPM active mode driver that is called by processes sending an RPM message outside of the sleep context. When the RPM driver is running in a multicore environment in the sleep context, special considerations must be taken to ensure that the sleep transaction is built properly, sleep sets are not entered when not desired, and coordination with active mode RPM messages is in place.

The following assumptions may be made about the multicore environment that may include the RPM sleep driver: each core has an SPM hardware block that controls the power state of that core and handshakes with the RPM when the core enters its low power mode; the apps processor as a whole is one RPM master (not one master per core), and thus there is one sleep set for the apps processor; the RPM waits for handshakes from each core's SPM before honoring the apps sleep set; the RPM sleep driver is used in such a way that the sleep code first calls an RPM start function to start a transaction, then subsequent calls are made to add resources to the sleep set, and then an RPM send function is called to send the transaction.

As mentioned above, each LPRM may be entered only once by the last core to call the "enter" function. However, there exists the possibility that multiple cores could be calling their enter functions at the same time, and sharing the responsibility of creating the final RPM transaction for the sleep set. Since both cores may manipulate the transaction using the same RPM handle, they may share a transaction, and the transaction may be started, modified, or sent, by any core. To protect against one core trying to start an RPM transaction while the other core is sending an RPM transaction, a sleep spinlock may be used. The spinlock may be held only around RPM start and RPM send. It may not be held when adding resources to the sleep set, since it is assumed that each core will be writing to disjoint parts of the sleep set.

Figure 6:
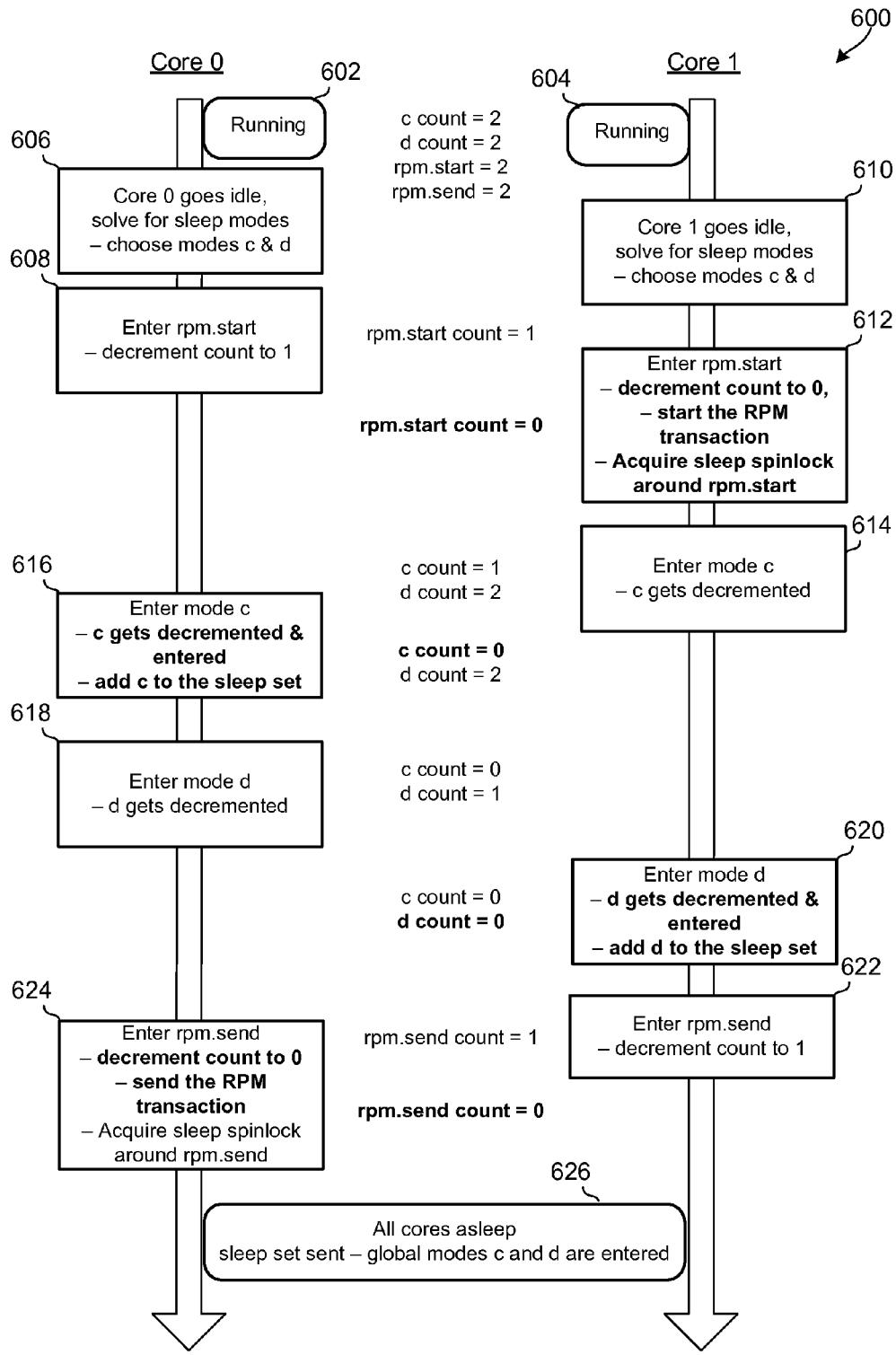

FIG. 6 illustrates an aspect method 600 in which a multicore processor system coordinates the interleaved building of a transaction. The multicore processor system may include one or more registers/memory locations associated with each of the different resource low power resource modes (LPRM), as well as registers/memory locations associated with the rpm.start and rpm.send operations. In the illustrated example of FIG. 6, global LPRMs c and d are shared by all the cores (e.g., core 0 and core 1).

In blocks 602 and 604, core 0 and core 1 of the multicore processor are in a run state and using/driving global resources. In block 606, core 0 may go idle and perform operations to "solve" the sleep modes (e.g., run the "solver" task/process to determine which low power modes for the various resources should be entered). As part of this process, core 0 may perform operations that identify modes c and d as available low power modes, and select global modes c and d for entry in block 606.

As discussed above, a multicore processor system may maintain a count associated with each LPRM that represents how many times that LPRM has been entered and exited. The count may initially contain a value that corresponds to the number of running cores that share the LPRM. In the illustrated example of FIG. 6, since two cores (i.e., core 0 and core 1) share global LPRMs c and d, the memory locations associated with LPRMs c and d each start with a value of two (LPRM c=2, LPRM d=2). Likewise, the memory locations associated with the rpm.start and rpm.send functions may store a value of two (rpm.start=2, rpm.send=2).

In block 608, core 0 may enter the rpm.start function and decrement the value stored at the memory location and/or in a variable associated with rpm.start function (rpm.start=1). Since the memory location associated with rpm.start function contains a non-zero value, core 0 does not initiate the start of the RPM transaction.

In block 610, core 1 may enter an idle state, solve for sleep modes, and choose modes c and d. In block 612, core 1 may enter the rpm.start function and decrement the value stored by the memory location associated with rpm.start function (rpm.start=0). Since the memory location associated with rpm.start function stores a value that transitions form one to zero (i.e., now contains a zero value), core 1 may initiate the start of the RPM transaction.

In block 614, core 1 may enter global LPRM c and decrement the value stored by the memory location associated with LPRM c (LPRM c=1). Since the memory location associated with LPRM c contains a non-zero value, core 1 does not add LPRM c to the sleep set in block 614.

In block 616, core 0 may enter global LPRM c, decrement the value stored by the memory location associated with LPRM c (LPRM c=0). Since the value stored by the memory location associated with LPRM c now contains a zero value, core 0 may add LPRM c to the sleep set. That is, in block 616, core 0 adds global LPRM c to the sleep set transaction started by core 1.

In block 618, core 0 may enter global LPRM d and decrement the value stored by the memory location associated with LPRM d (LPRM d=1). Since the memory location associated with LPRM d contains a non-zero value, core 0 does not add LPRM d to the sleep set in block 618.

In block 620, core 1 may enter global LPRM d and decrement the value stored by the memory location associated with LPRM d (LPRM d=0). Since the value stored by the memory location associated with LPRM d transitions now contains a zero value, core 1 adds LPRM d to the sleep set in block 620.

In block 622, core 1 may enter rpm.send and decrement the value stored by the memory location associated with rpm.send function (rpm.send=1). Since the memory location associated with rpm.send function contains a non-zero value, core 1 does not send the RPM transaction. In block 624, core 0 may enter rpm.send and decrement the value stored by the memory location associated with rpm.send function (rpm.send=0). Since the value stored by the memory location associated with rpm.send function transitions from one to zero (i.e., now contains a zero value), core 0 may send the RPM transaction. Thus, in block 624, core 0 sends the sleep set transaction that core 1 started.

In block 626, both cores may be in a sleep mode, the sleep set may be sent, and global LPRMs c and d may be entered.

As mentioned above, there is a possibility that one core could wake up and modify the transaction or the set of low power modes, while the other core is in the middle of building a sleep set transaction. In this case, the core that woke up could start a new transaction before the other core has sent its transaction. If this happens, the RPM driver may cancel the first transaction and only honor the second one.

Figure 7:
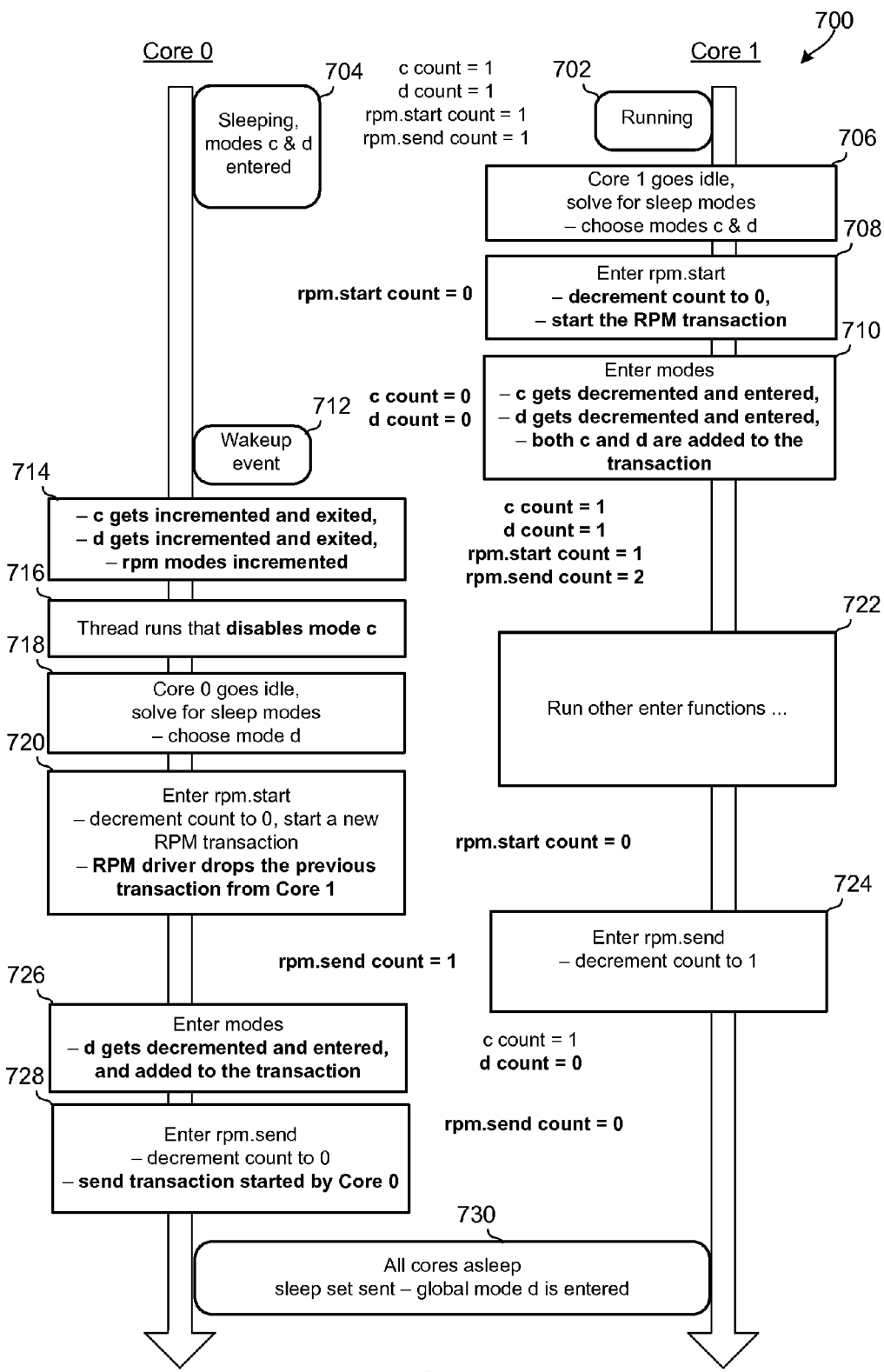

FIG. 7 illustrates an aspect method 700 for sending overlapping RPM transactions, and coordinating enter and exit functions among the cores that send overlapping RPM transitions. In the illustrated example of FIG. 7, LPRMs c and d are global (e.g., shared by core 0 and core 1), and the memory locations associated with rpm.start function, rpm.send function and LPRMs c and d each store the value of one (LPRM c=1, LPRM d=1, rpm.start=1, rpm.send=1).

In block 702, core 1 is run state. In block 704 core 0 is in a sleep state and global modes c and d have been entered.

In block 706, core 1 may go idle, run a "solver" process to determine which low power modes for the various resources should be entered, identify modes c and d as available low power modes, and choose global LPRMs c and d to enter. In block 708, core 1 may enter the rpm.start function and decrement the value stored by the memory location associated with rpm.start function (rpm.start=0). Since the value stored by the memory location associated with rpm.start function transitions from one to zero (i.e., now contains a zero value), core 1 may initiate the start the RPM transaction in block 708.

In block 710, core 1 may enter LPRMs c and d and decrement the values stored by the memory locations associated with LPRMs c and d (LPRM c=0, LPRM d=0). Since the values stored by the memory locations associated with LPRMs c and d transition from one to zero, core 1 may also add LPRMs c and d to the sleep set in block 710.

In block 722, core 1 may execute various other functions (e.g., execute other enter functions, decrement values, etc.).

In block 712, a wake up event may be detected on core 0 (e.g., an interrupt may be received by core 0). In block 714, the multicore processor may exit the sleep mode and increment the values of the memory locations corresponding to rpm.start, rpm.send, and global LPRMs c and d (e.g., LPRM c increments to 1, LPRM d increments to 1, rpm.start increments to 1, rpm.send increments to 2).

In block 716, the system may execute a thread that disables global LPRM c.

In block 718, core 0 may enter an idle state, run a "solver" process to determine which low power modes for the various resources should be entered, identify available low power modes, and choose global LPRM d to enter. In block 720, core 0 may enter rpm.start, decrement the value of the memory locations corresponding to rpm.start (rpm.start=0), and initiate the start of a new RPM transaction. Also in block 720, the RPM driver may drop the previous transaction from core 1. In an aspect, the RPM driver may be configured to drop previous transactions in response to detecting the start of the new RPM transaction.

In block 724, core 1 enter rpm.send and decrement the value stored by the memory locations associated with rpm.send function (rpm.send=1). Since the memory locations associated with rpm.send function contains a non-zero value, core 1 does not send the RPM transaction.

In block 726, core 0 may enter global LPRM d and decrement the value stored by the memory locations associated with LPRM d (LPRM d=0). Since the value stored by the memory locations associated with LPRM d contains a zero value, in block 726, core 0 may also add LPRM d to the transaction.

In block 728, core 0 may enter rpm.send and decrement the value stored by the memory locations associated with rpm-.send function (rpm.send=0). Since the value stored by the memory locations associated with rpm.send function transitions from one to zero (i.e., now contains a zero value), core 0 may send the RPM transaction that core 0 started (the RPM driver dropped the previous transaction started by core 1). In block 730, both cores may be in a sleep mode, the sleep set may be sent, and global LPRM d may be entered.

In various aspects, before sending a sleep set transaction, the previous transaction may be invalidated so that resources from the previous transaction does not enter their sleep set undesirably. In a multicore environment, the sleep set may not always be sent, if there is already an active message in flight. However, the SPMs may still have sent their shutdown requests to the RPM, so the RPM would transition the master to its sleep set, and may by default use the previous sleep set, which may not be desirable. To solve this, in an aspect, the RPM may support an "auto-invalidate" feature such that if a resource is marked for auto-invalidate, the RPM will invalidate the resource's sleep set when the master wakes up from sleep. This prevents the master from having to send an explicit invalidate before every sleep set transaction. For coordinating RPM communications between active and sleep contexts, a previous sleep set may have already been auto-invalidated, so no sleep set would be entered in this case, which is the desired behavior. The RPM may support auto-invalidate both on a per-resource basis, as well as on a global basis (i.e., always invalidate all resources, etc.). It may be up to the calling code to decide which one is preferable, based on the nature of the resources that are being added to the sleep set.

In the various aspects, the multicore processor system may be configured to invalidate stale sleep sets. In an aspect, an invalidate resource may be used to invalidate a previous transaction before sending a sleep set transaction. A sleep set invalidate request may be sent as the first message in any sleep set transaction, and the RPM driver may be configured to guarantee that the invalidate request will execute first if it is present in a transaction. Sending an invalidate request while entering sleep mode (e.g., while sending the sleep set transaction) eliminates potential race conditions that would otherwise occur if the invalidate request were sent as a separate message while exiting the sleep modes.

In various aspects, the multicore processor system may be configured to enable and/or disable shared low power resources modes (LPRMs). When low power modes for a shared resource get enabled, cores that share that resource are able to enter a lower power mode, and may be woken up to re-evaluate their sleep sets. Whenever a shared low power mode is enabled or disabled, the sleep subsystem may modify the enabled list for each core to reflect the changes.

In various aspects, the multicore processor system may be configured to perform SPM handshaking operations. As mentioned above, the last core to go down is generally the one that sends the RPM sleep set. However, since the RPM may wait for handshakes from each core's SPM before honoring the apps sleep set, the cores that are not the last to go down may still need to program their SPM hardware to handshake with the RPM, if shared low power modes are chosen for entry.

In various aspects, a handshake LPRM (e.g., spm.handshake LPRM) may exist for each core. Since each core may solve for local and global modes regardless of whether a core is the last core to go down, the cores that are not the last down may still enter the handshake LPRM. If the cores determine that it is acceptable to enter a global mode that requires the RPM, the cores may program the SPM to handshake with the RPM.

In various aspects, the multicore processor system may be configured to send an RPM-timed trigger. As mentioned above, each core that goes to sleep may have its own timer hardware and its own hard wakeup time. Whenever a core goes idle, it may calculate a "backoff time" based on the selected LPRMs, and program the calculated backoff time into local hardware. When the last core goes to sleep, a timed trigger may be sent to the RPM to indicate the next scheduled wakeup time for any of the cores. The timed trigger allows the RPM to have knowledge of when the processor is expecting a wakeup so that the RPM can make informed decisions about which low power modes are to be entered. The timed trigger also allows the RPM to set a timer during system low power modes, so that it can wake up the processor on time, since the timer hardware may not be guaranteed to function during system low power modes.

In order for the last core to go down to know what time the next core will wake up, various aspects may include a store variable for each core that identifies a core's absolute wakeup time (after subtracting backoff). An LPRM (e.g., a handshake LPRM, etc.) may calculate the wakeup time for a core and store it as a global variable. The LPRM may also calculate the minimum time until the next wakeup and send it as the timed trigger to the RPM.

In addition to sending the correct timed trigger to the RPM, the last core to go down may also need to ensure that the RPM wakeup interrupt is routed to the core with the soonest deadline, so that core can wake up and service its timer. The core with the soonest deadline may be configured to wake up first from system low power modes so that it can trigger its local timer interrupt to fire.

The absolute wakeup time for each core may be stored in a shared location. Each core may use the minimum duration until the next core's wakeup as a soft wakeup hint when choosing low power modes.

In various aspects, the multicore processor system may be configured to coordinate RPM communications between cores. For communication between the master processor and the RPM processor, the interrupts from the RPM to the master processor may not be on a per-core basis. Therefore, the RPM interrupt may be routed to any core at any particular time. This interrupt may be used by the RPM to acknowledge messages that have been received from the processor, and also to send notification interrupts to the processor.

Each core may send an RPM message at any time while it's active. In active modes, the core may acquire an operating system lock (i.e., mutex) in the RPM driver to ensure that only one core is sending a message at a time. During sleep, however, when sending a sleep set, the processor's RPM driver may poll for the acknowledge interrupt to come back from the RPM, since the sleep code may be executing in an INTLOCKed context.

In order to prevent one core trying to send a sleep set while the other core is waiting for an acknowledge interrupt from the RPM, when the RPM driver receives a sleep set transaction request, it may first check to see if the operating system lock is already held. If it is, then the RPM driver may not send the sleep set and instead, ignore the request and interrupt the core that requested it. The presence of the interrupt may cause that core to exit sleep. On the next entry into sleep, the sleep set may be re-evaluated, and the sleep code may try again to send the sleep set if applicable.

When the RPM driver is polling for the RPM interrupt, it may interface with the interrupt controller driver to ensure that the interrupt is routed to the core that is polling.

Depending on the high level operating system (HLOS), the sleep code may run in a different process than the threads that are sending RPM transactions during active modes. In such cases, the sleep transaction may use a spinlock to ensure synchronization between other processes that are sending messages.

Figure 8:
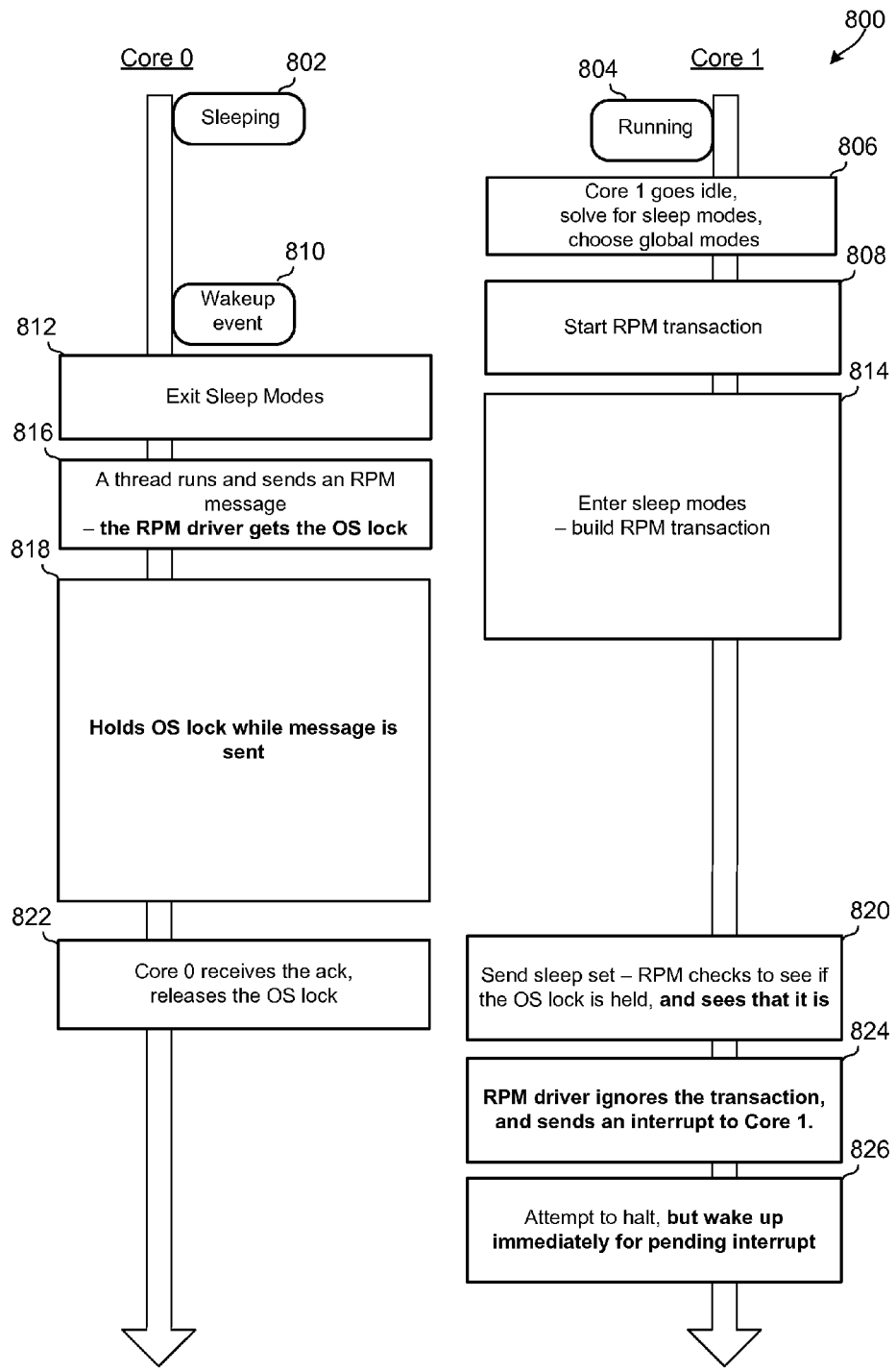

FIG. 8 illustrates an aspect method 800 for coordinating RPM communications between cores such that one core is prevented from sending a sleep set while another is waiting for an acknowledgment interrupt. In the illustrated example of FIG. 8, LPRMs c and d are global (e.g., shared by core 0 and core 1), and the memory locations associated with rpm.start function, rpm.send function and LPRMs c and d each store the value of one (LPRM c=1, LPRM d=1, rpm.start=1, rpm.send=1).

In block 802, core 1 is in a sleep state, and global modes c and d have been entered. In block 804 core 1 is in a run state. In block 806, core 1 may go idle, solve for sleep modes (e.g., run a "solver" process) and choose global modes for entry. In block 808, core 1 may initiate the start of the RPM transaction.

In block 810, a wake up event may be detected on core 0 (e.g., an interrupt may be received by core 0). In block 812, the multicore processor may exit the sleep mode.

In block 814, core 1 may enter sleep mode and build an RPM transaction.

In block 816, core 0 may run a thread that sends an RPM message. Also in block 816, the RPM driver may get an operating system lock. It should be noted that the thread would not execute if the operating system had been locked by core 1. As discussed above, each core may send an RPM message at any time while it's active, and the core may acquire an operating system lock in the RPM driver to ensure that only one core is sending a message at a time.

In block 818, core 0 may hold on to the operating system lock while the message is sent.

In block 820, core 1 may send the sleep set. As discussed above, when sending a sleep set, the processor's RPM driver may poll for the acknowledge interrupt to come back from the RPM, since the sleep code may be executing in an INTLOCKed context.

Also in block 820, the RPM may check to see if the OS lock is held, and determine that it is. As mentioned above, in order to prevent one core trying to send a sleep set while the other core is waiting for an acknowledge interrupt from the RPM, when the RPM driver receives a sleep set transaction request, it may first check to see if the operating system lock is already held. If it is, then the RPM driver may not send the sleep set, but instead, ignore the request and interrupt the core that requested it. The presence of the interrupt may cause that core to exit sleep, and on the next entry into sleep, the sleep set may be re-evaluated, and the sleep code may try again to send the sleep set if applicable.

In block 822, core 0 may receive an acknowledgment interrupt and release the operating system lock.

In block 824, the RPM driver may ignore the RPM transaction and send the interrupt to core 1.

In block 826, core 1 may attempt to halt, but wake up immediate for the pending interrupt.

Thus, in blocks 812, 816, 818 and 822, core 0 enters the wake state and sends an RPM message during the same period that core 1 was sending its sleep set.

As mentioned above, interrupts from the RPM may be routed to any core at any particular time, which may be used by the RPM to acknowledge messages that have been received from the processor and to send notification interrupts.

Figure 9:
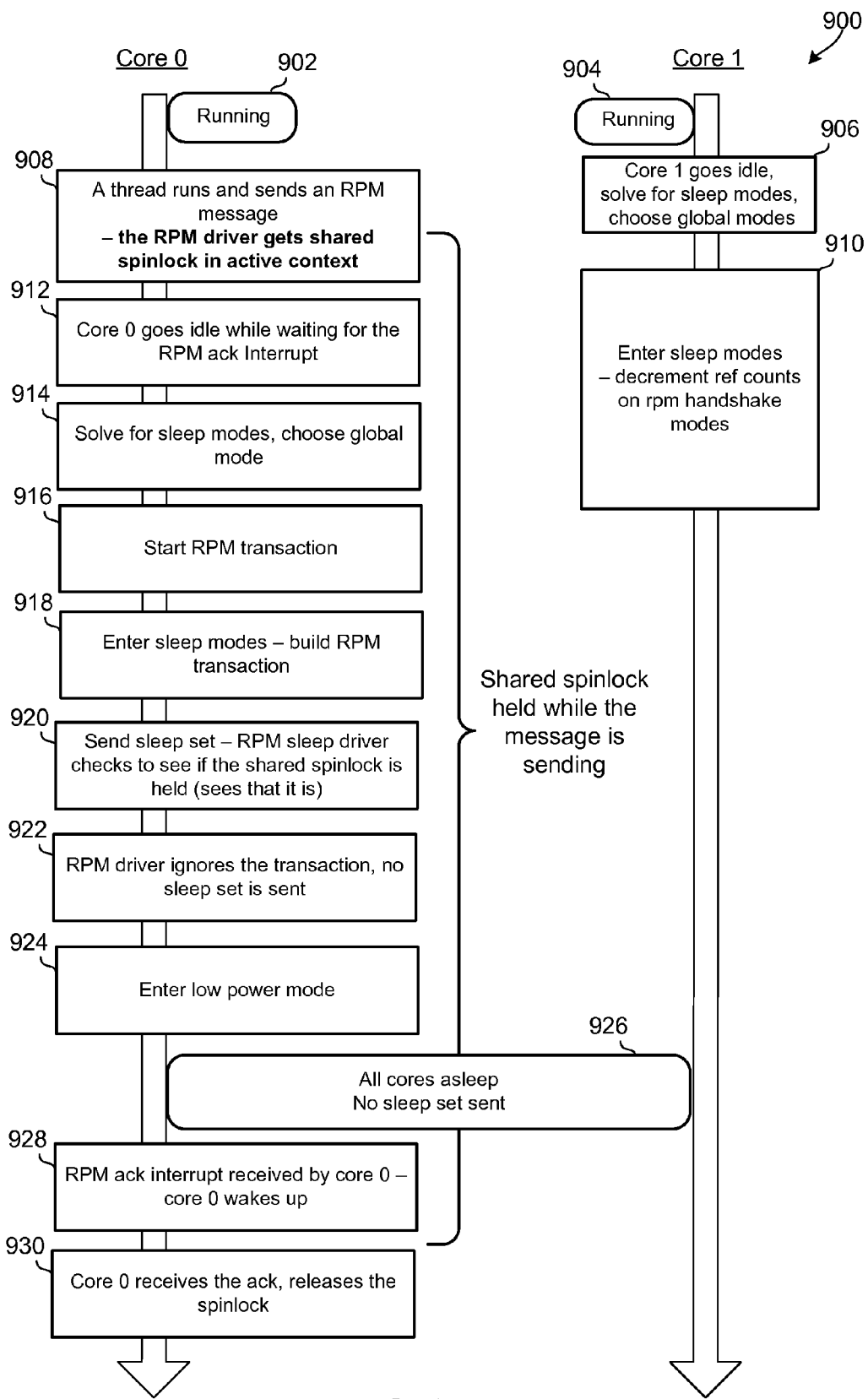

FIG. 9 illustrates an aspect method 900 for checking a shared spinlock in an RPM driver during sleep. In block 902, core 0 is in a run state. In block 904 core 1 is in a run state. In block 906, core 1 may go idle, solve for sleep modes (e.g., run a "solver" process) and choose global modes for entry. In block 908, core 0 may execute a thread, send an RPM message. Also in block 908, the RPM driver may get a shared spinlock in an active context. In block 910, core 1 may enter sleep modes and decrement the appropriate reference counts on the RPM handshake modes.

In block 912, core 0 may go idle while waiting for the RPM acknowledgment interrupt. In block 914, core 0 may solve for sleep modes and choose the global mode to enter. In block 916, core 0 may start a RPM transaction. In block 918, core 0 may enter the sleep modes and build an RPM transaction. In block 920, core 0 may send a sleep set. Also in block 920, the RPM sleep driver may check to see if the shared spinlock is held. In the illustrated example of FIG. 9, the RPM sleep driver detects that spinlock is currently being held, and in block 922, ignores the transaction and no sleep set is sent. In an aspect the system may be configured such that, even though both SPMs perform a handshake with the RPM, no sleep set is be applied on the RPM as per the auto-invalidate feature mentioned previously.

In block 924, core 0 may enter a low power mode. In block 926, all the cores are in a sleep state and no sleep sets are sent. In block 928, core 0 may received the RPM acknowledgment transaction and wake up. In bock 930, core 0 may receive the acknowledgment and release the spinlock.

The various aspects provide a number of useful benefits. The various aspects improve upon the selection and implementation of low power modes on SOCs and multicore processors. For example, the various aspect do not require the zero core to monitor the others, do not require a process that resides above the sleep process to monitor the cores (as required by other operating systems), and do not require the cores to block and wait until all the global resources are idle (as required by other operating systems). The various aspects also implement dynamic low power resource modes on SOCs and multicore processors in a manner that allows all the cores/processing units to be treated in a symmetric fashion, and such that each core may choose its operating state independent of the other cores.

A power function may be used to determine which resources, if any, should be placed in a low power resource mode. The power function may be a function of the sum of the power savings and the energy cost of bringing the resources down and back up to operation. Various aspects may use the power function to determine the net power savings associated with each of the potential system low power configurations afforded by various combinations of implemented low power resource modes. The various aspects may calculate the net power savings as the amount of power saved over a calculated time frame, offset by the amount of work required to place the various resources into a low power resource mode and return them to an operation mode. In various aspects, the net power savings may be calculated by a function using a simple linear polynomial module, having an expected idle time X with a slope M and an offset B, wherein the compute power savings is MX+B.

Various aspects may calculate the net power savings periodically based on values stored in configurable system parameters.

In the various aspects, a number of mechanisms may be used in the low power resource mode selections solver to identify an optimum set of low power resource modes based upon the current operating state and conditions. A variety of known algorithm or heuristic solutions to the knapsack problem may be implemented in the low power resource mode selections solver. Such methods may involve if/then/else logic tree algorithms, a table lookup algorithm, and comparison methods which work systematically through the alternative permutations and combinations of alternative low power resource modes of different resources.

The implementation of dynamic low power resource modes in accordance with the various aspects also provides a number of useful benefits beyond merely saving additional battery power. As one benefit, the low power resource modes of various resources and their definitions are mostly independent of the code that implements the modes. The relevant driver calls may be included within the "enter" and "exit" functions, so the low power resource mode is not affected. The solver process may take care of determining when the low power resource mode should be entered or exited based upon hard data, such as the power and latency data for each low power resource mode, and the dynamic restrictions (e.g., latency requirements) and operating conditions present in the current operating state. Thus, the developer does not have to try to anticipate combinations of such parameters in order to hardcode suitable low power resource modes into the device.

Another benefit of the aspects described above is that the computing device is not required to select a single defined low power resource mode from a preconfigured or predefined set of system modes, but can select a combination of low power resource modes to dynamically implement a low power configuration for the system based upon the current operating state, resources, operating condition, estimated sleep cycle, device configuration, etc. This is advantageous because prior known power management systems are configured to select between a set of predefined low power configurations (e.g., one of mode 1, mode 2, or mode 3), whereas the aspects described above enable a device to dynamically select one or more low power resource modes for each resource available for entering a low power mode, providing much greater flexibility to implement system low power configurations best suited to current conditions and states. For example, assume a particular processor has three resources A, B, and C having low power resource modes A', B', and C' respectively. The low power resource modes may have different latencies, such as low power resource mode A' may have 0.4 ms of latency, low power resource mode B' may have 0.5 ms of latency, and low power resource mode C' may have 0.6 ms of latency. If, for example, a client places 1 millisecond latency requirement on the system (e.g., a 1 ms worst case permissible latency), low power modes of resources A, B, and C can be enabled or disabled independent from each other so long as the combination of selected low power modes meets the worst case latency requirement. For example, if the processor goes into an idle state and resources A, B, and C are all enabled, the system can pick low power resource mode A' (0.4 ms of latency), low power resource mode B' (0.5 ms of latency), low power resource mode C' (0.6 ms of latency), modes A and B (0.9 ms of latency), or modes A and C (1 ms of latency). Thus, in the various aspects, a solver task may pick the best set of low power resource modes to save the most power given the 1 ms worst case latency tolerance.

Additionally, typical power management systems require that the clients have an inactive mode and an active mode, and the latency tolerance is dependent on a current performance state. In the various aspects described above, the client mechanisms can be "present" or "not present" rather than "active" or "inactive". That is, in the various aspects, the various low power resource modes may be traversed to eliminate possible states, rather than being selected based on an operating state (e.g., active or inactive). Further, the various aspects enable clients to create, register, and/or ignore low power resource modes for the various resources, and to dynamically select a combination of low power resource modes to enable a large number of possible system low power configurations. This allows the system clients to further control, and fine tune, the low power states of the device.

Another benefit of the aspects described above is that the computing device processor does not need to be aware of the various operating modes of the system clients. In the various aspects, clients may directly submit only their latency tolerance. As such, the processor does not need to know about the various details associated with operation states of each client. The processor needs to only know the registered latency tolerances of the clients, and select low power resources to enter a low power resource mode based on the reported latency tolerances. In the various aspects, the setting of the tolerances and the low power modes may be by discrete entities. For example, a USB client may set a latency tolerance but not necessarily a low power mode. Each low power resource mode may have a set of signaling mechanisms to indicate whether they can be entered on any given sleep cycle that is completely independent from the latency consideration.

As a further benefit, a new NPA programming node may be provided in an aspect to enable clients to specify how long they expect to be asleep. For example, NPA programming node "/core/processor/wakeup" may be provided to enable clients to specify that they expect to be asleep (i.e., not utilizing the processor or resources) for no longer than "X" microseconds (up to 71 hours). Such a programming capability may simplify the development of client applications for compatibility with processor idle states and low power configurations.

In a further aspect, the results of solver calculations maybe cached in memory so that the optimum low power configuration may be reused without having to re-perform the solver algorithm when the same or similar operating conditions (e.g., operating state, temperature, and latency restrictions) are present at the time that an idle state may be entered. In this way, the processor can quickly enter the idle state by skipping the process of performing the solver algorithm while still achieving optimum or near optimum power savings. In a further aspect, the operating state and conditions may be statistically analyzed so that cached optimum low power configurations may be linked to statistically determined ranges of conditions and states.

Figure 10:
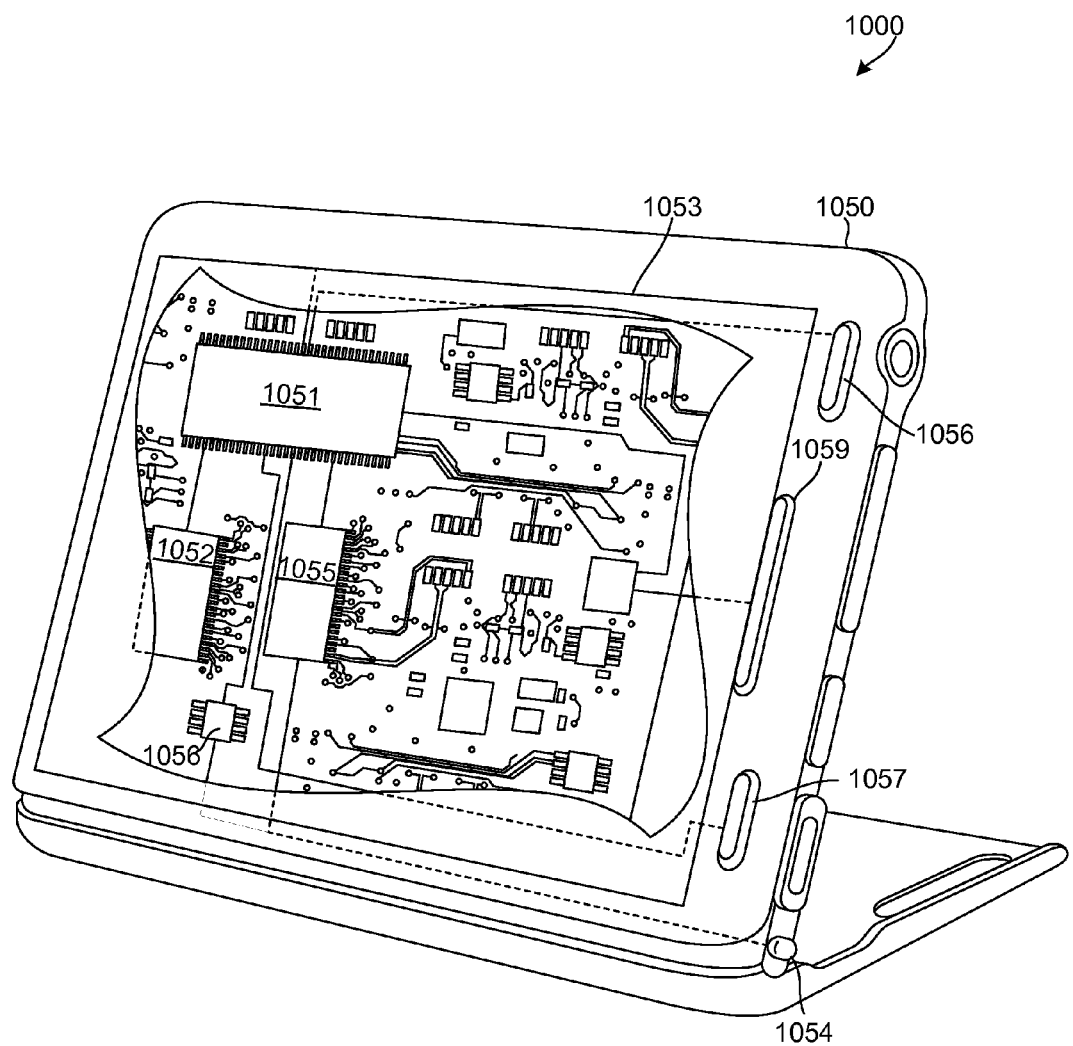
FIG. 10 is a component block diagram of a mobile device suitable for use in an aspect.

Typical mobile devices 1000 suitable for use with the various aspects will have in common the components illustrated in FIG. 10. For example, an exemplary mobile receiver device 1000 may include a processor 1051 coupled to internal memory 1052, a display 1053, and to a speaker 1059. Additionally, the mobile device 1000 may have an antenna 1054 for sending and receiving electromagnetic radiation that is connected to a mobile multimedia receiver 1056 coupled to the processor 1051. In some aspects, the mobile multimedia receiver 1056 may include an internal processor 1058, such as a digital signal processor (DSP) for controlling operations of the receiver 1056 and communicating with the device processor 1051. Mobile devices typically also include a key pad 1056 or miniature keyboard and menu selection buttons or rocker switches 1057 for receiving user inputs.

The processor 1051 may be any programmable microprocessor, microcomputer or multiple processor chip or chips that can be configured by processor-executable software instructions (applications) to perform a variety of functions, including the functions of the various aspects described herein. Also, the functions of the various aspects may be implemented in a DSP processor 1058 within the receiver 1056 configured with DSP-executable instructions. Typically, software applications and processor-executable instructions may be stored in the internal memory 1052 before they are accessed and loaded into the processor 1051. In some mobile devices, the processor 1051 may include internal memory sufficient to store the application software instructions. In some mobile devices, the secure memory may be in a separate memory chip coupled to the processor 1051. In many mobile devices 1050, the internal memory 1052 may be a volatile or nonvolatile memory, such as flash memory, or a mixture of both. For the purposes of this description, a general reference to memory refers to all memory accessible by the processor 1051, including internal memory 1052, removable memory plugged into the mobile device, and memory within the processor 1051 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for conserving power in a multicore computing device that includes a resource power manager (RPM) processor for managing resources shared by two or more execution environments, the method comprising:

maintaining a reference count in memory for each low power resource shared by more than one core of the multicore computing device;

determining which cores are asleep by accessing a variable shared between cores running threads and cores running idle threads, wherein the shared variable is incremented by each core upon the performance of an enter function of an idle thread and decremented by each core upon the performance of an exit function of the idle thread;

independently adjusting a value stored in memory based on each core's power state and each core's usage of the low power resource associated with the memory location; and using the value at the memory location to determine when to enter a system low power configuration.

2. The method of claim 1, wherein each core of the multi-core computing device operates under an operating system that is different from that of one or more of the other cores in the multicore computing device.

3. The method of claim 1, wherein at least one core of the multicore computing device shares at least one resource that binds the core to operations of at least one other core, and each core is configured to enter and exit low power modes independent of each of the other cores.

4. The method of claim 1, further comprising:
identifying resources that may be placed in a low power mode based upon a flag bit setting;
registering a latency requirement on a per-core or global basis;
selecting a most stringent latency requirement from the registered latency requirements;
evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core;
selecting a combination of low power resource modes that maximizes potential power savings and has a total latency requirement that is less than or equal to the selected worst case latency requirement on the current core; and
entering the selected combination of low power resource modes by executing an enter function of each of the selected low power modes on each of the identified resources.

5. The method of claim 4, wherein entering the selected combination of low power resource modes by executing an enter function of each of the selected low power modes on each of the identified resources comprises executing the enter function when the reference count value equals zero, for shared modes.

6. The method of claim 4, further comprising:
determining potential power savings of each evaluated low power resource mode based upon a potential power savings per unit time at a current temperature times an expected idle time, for the idle time expected on the current core.

7. The method of claim 1, further comprising:
marking a resource for auto-invalidate; and
invalidating, in the RPM processor, a sleep set associated with the marked resource.

8. The method of claim 1, further comprising:
invalidating a previous transaction such that resources from the previous transaction does not enter their sleep set undesirably.

9. The method of claim 1, wherein each core in the multi-core computing device has a subsystem power management (SPM) hardware block that controls the power state of that core and handshakes with the RPM processor when the core enters its low power mode, the method further comprising:

detecting, in a RPM sleep driver, that a spinlock is currently being held;
ignoring the transaction and not sending a sleep set transaction in response to detecting that the spinlock is currently being held; and
not applying the sleep set on the RPM processor despite the SPM hardware block of each core performing a handshake with the RPM.

10. The method of claim 1, further comprising:
receiving, in an RPM driver, a spinlock in active context;
entering a sleep mode of a first core of the multicore computing device;
initiating an idle process on a zeroth core of the multicore computing device while waiting for an RPM acknowledgment interrupt;
solving, for sleep modes on the zeroth core and choosing a global low power mode for the zeroth core to enter;
entering the global low power mode on the zeroth core;
receiving the RPM acknowledgment interrupt on the zeroth core; and
releasing the spinlock.

11. The method of claim 1, further comprising:
initiating a sending of an RPM message on a zeroth core;
receiving, in an RPM driver, an operating system lock;
entering a sleep mode on a first core of the multicore computing device and building an RPM transaction;
initiating a sending of a sleep set on the first core;
receiving a sleep set transaction request on the RPM driver from the first core and checking to determine if the operating system lock is held; and
ignoring sleep set transaction request and sending an interrupt signal to the first core if it is determined that the operating system lock is held.

12. The method of claim 1, further comprising using a spinlock to protect against one core starting an RPM transaction while another core sends another RPM transaction.

13. The method of claim 12, wherein using a spinlock to protect against one core starting an RPM transaction while another core is sending an RPM transaction comprises holding the spinlock during a RPM start operation and during a RPM stop operation.

14. The method of claim 12, wherein each core in the multicore computing device writes to disjoint parts of a sleep set, and wherein using a spinlock to protect against one core starting an RPM transaction while another core is sending an RPM transaction comprises releasing the spinlock when adding resources to the sleep set.

15. A multicore computing device, comprising:
a memory; and
one or more processors coupled to the memory, wherein the one or more processors include a resource power manager (RPM) processor for managing resources shared by two or more execution environments and wherein the one or more processors are configured with processor-executable instructions so the computing device performs operations comprising:
maintaining a reference count in memory for each low power resource shared by more than one core of the multicore computing device;
determining which cores are asleep by accessing a variable shared between cores running threads and cores running idle threads, wherein the shared variable is incremented by each core upon the performance of an enter function of an idle thread and decremented by each core upon the performance of an exit function of the idle thread;

independently adjusting a value stored in memory based on each core's power state and each core's usage of the low power resource associated with the memory location; and using the value at the memory location to determine when to enter a system low power configuration.

16. The multicore computing device of claim 15, wherein the one or more processors are configured with processor-executable instructions so the multicore computing device performs operations such that each core of the multicore computing device operates under an operating system that is different from that of one or more of the other cores in the multicore computing device.

17. The multicore computing device of claim 15, wherein the one or more processors are configured with processor-executable instructions so the multicore computing device performs operations such that at least one core of the multicore computing device shares at least one resource that binds the core to operations of at least one other core, and each core is configured to enter and exit low power modes independent of each of the other cores.

18. The multicore computing device of claim 15, wherein the one or more processors are configured with processor-executable instructions so the multicore computing device performs operations further comprising:

identifying resources that may be placed in a low power mode based upon a flag bit setting;

registering a latency requirement on a per-core or global basis;

selecting a most stringent latency requirement from the registered latency requirements;

evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core;

selecting a combination of low power resource modes that maximizes potential power savings and has a total latency requirement that is less than or equal to the selected worst case latency requirement on the current core; and entering the selected combination of low power resource modes by executing an enter function of each of the selected low power modes on each of the identified resources.

19. The multicore computing device of claim 18, wherein the one or more processors are configured with processor-executable instructions so the multicore computing device performs operations such that entering the selected combination of low power resource modes by executing an enter function of each of the selected low power modes on each of the identified resources comprises executing the enter function when the reference count value equals zero, for shared modes.

20. The multicore computing device of claim 18, wherein the one or more processors are configured with processor-executable instructions so the multicore computing device performs operations further comprising:

determining potential power savings of each evaluated low power resource mode based upon a potential power savings per unit time at a current temperature times an expected idle time, for the idle time expected on the current core.

21. The multicore computing device of claim 15, wherein the one or more processors are configured with processor-executable instructions so the multicore computing device performs operations further comprising:

marking a resource for auto-invalidate; and invalidating, in the RPM processor, a sleep set associated with the marked resource.

22. The multicore computing device of claim 15, wherein the one or more processors are configured with processor-executable instructions so the multicore computing device performs operations further comprising:

invalidating a previous transaction such that resources from the previous transaction does not enter their sleep set undesirably.

23. The multicore computing device of claim 15, wherein:

the multicore computing device further comprises a subsystem power management (SPM) hardware block configured to control a power state of a core and handshakes with the RPM processor when the core enters its low power mode; and the one or more processors are configured with processor-executable instructions so the multicore computing device performs operations further comprising:

detecting, in an RPM sleep driver, that a spinlock is currently being held;

ignoring the transaction and not sending a sleep set transaction in response to detecting that the spinlock is currently being held; and not applying the sleep set on the RPM processor despite the SPM hardware block of each core performing a handshake with the RPM.

24. The multicore computing device of claim 15, wherein the one or more processors are configured with processor-executable instructions so the multicore computing device performs operations further comprising:

receiving, in an RPM driver, a spinlock in active context;

entering a sleep mode of a first core of the multicore computing device;

initiating an idle process on a zeroth core of the multicore computing device while waiting for an RPM acknowledgment interrupt;

solving, for sleep modes on the zeroth core and choosing a global low power mode for the zeroth core to enter;

entering the global low power mode on the zeroth core;

receiving the RPM acknowledgment interrupt on the zeroth core; and releasing the spinlock.

25. The multicore computing device of claim 15, wherein the one or more processors are configured with processor-executable instructions so the multicore computing device performs operations further comprising:

initiating a sending of an RPM message on a zeroth core;

receiving, in an RPM driver, an operating system lock;

entering a sleep mode on a first core of the multicore computing device and building an RPM transaction;

initiating a sending of a sleep set on the first core;

receiving a sleep set transaction request on the RPM driver from the first core and checking to determine if the operating system lock is held; and ignoring sleep set transaction request and sending an interrupt signal to the first core if it is determined that the operating system lock is held.

26. The multicore computing device of claim 15, wherein the one or more processors are configured with processor-executable instructions so the multicore computing device performs operations such that the processor is configured with processor-executable instructions to perform operations further comprising using a spinlock to protect against one core starting an RPM transaction while another core sends another RPM transaction.

27. The multicore computing device of claim 26, wherein the one or more processors are configured with processor-executable instructions so the multicore computing device performs operations such that using a spinlock to protect against one core starting an RPM transaction while another core is sending an RPM transaction comprises holding the spinlock during a RPM start operation and during a RPM stop operation.

28. The multicore computing device of claim 26, wherein the one or more processors are configured with processor-executable instructions so the multicore computing device performs operations such that each core in the multicore computing device writes to disjoint parts of a sleep set, and wherein using a spinlock to protect against one core starting an RPM transaction while another core is sending an RPM transaction comprises releasing the spinlock when adding resources to the sleep set.

29. A non-transitory computer readable storage medium having stored thereon processor-executable software instructions configured to cause a processor to perform operations for conserving power in a multicore computing device that includes a resource power manager (RPM) processor for managing resources shared by two or more execution environments, the operations comprising:
    maintaining a reference count in memory for each low power resource shared by more than one core of the multicore computing device;
    determining which cores are asleep by accessing a variable shared between cores running threads and cores running idle threads, wherein the shared variable is incremented by each core upon the performance of an enter function of an idle thread and decremented by each core upon the performance of an exit function of the idle thread;
    independently adjusting a value stored in memory based on each core's power state and each core's usage of the low power resource associated with the memory location; and
    using the value at the memory location to determine when to enter a system low power configuration.

30. The non-transitory computer readable storage medium of claim 29, wherein the stored processor-executable software instructions are configured to cause a processor to perform operations such that each core of the multicore computing device operates under an operating system that is different from that of one or more of the other cores in the multicore computing device.

31. The non-transitory computer readable storage medium of claim 29, wherein the stored processor-executable software instructions are configured to cause a processor to perform operations such that at least one core of the multicore computing device shares at least one resource that binds the core to operations of at least one other core, and each core is configured to enter and exit low power modes independent of each of the other cores.

32. The non-transitory computer readable storage medium of claim 29, wherein the one or more processors are configured with processor-executable instructions so the computing device performs operations further comprising:
    identifying resources that may be placed in a low power mode based upon a flag bit setting;
    registering a latency requirement on a per-core or global basis;
    selecting a most stringent latency requirement from the registered latency requirements;
    evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core;
    selecting a combination of low power resource modes that maximizes potential power savings and has a total latency requirement that is less than or equal to the selected worst case latency requirement on the current core; and
    entering the selected combination of low power resource modes by executing an enter function of each of the selected low power modes on each of the identified resources.

33. The non-transitory computer readable storage medium of claim 32, wherein the stored processor-executable software instructions are configured to cause a processor to perform operations such that entering the selected combination of low power resource modes by executing an enter function of each of the selected low power modes on each of the identified resources comprises executing the enter function when the reference count value equals zero, for shared modes.

34. The non-transitory computer readable storage medium of claim 32, wherein the stored processor-executable software instructions are configured to cause a processor to perform operations further comprising:
    determining potential power savings of each evaluated low power resource mode based upon a potential power savings per unit time at a current temperature times an expected idle time, for the idle time expected on the current core.

35. The non-transitory computer readable storage medium of claim 29, wherein the stored processor-executable software instructions are configured to cause a processor to perform operations further comprising:
    marking a resource for auto-invalidate; and
    invalidating, in the RPM processor, a sleep set associated with the marked resource.

36. The non-transitory computer readable storage medium of claim 29, wherein the stored processor-executable software instructions are configured to cause a processor to perform operations further comprising:
    invalidating a previous transaction such that resources from the previous transaction does not enter their sleep set undesirably.

37. The non-transitory computer readable storage medium of claim 29, wherein the stored processor-executable software instructions are configured to cause a processor to perform operations such that each core in the multicore computing device has a subsystem power management (SPM) hardware block that controls the power state of that core and handshakes with the RPM processor when the core enters its low power mode, the method further comprising:
    detecting, in a RPM sleep driver, that a spinlock is currently being held;
    ignoring the transaction and not sending a sleep set transaction in response to detecting that the spinlock is currently being held; and
    not applying the sleep set on the RPM processor despite the SPM hardware block of each core performing a handshake with the RPM.

38. The non-transitory computer readable storage medium of claim 29, wherein the stored processor-executable software instructions are configured to cause a processor to perform operations further comprising:
    receiving, in an RPM driver, a spinlock in active context;
    entering a sleep mode of a first core of the multicore computing device;

initiating an idle process on a zeroth core of the multicore computing device while waiting for an RPM acknowledgment interrupt;

solving, for sleep modes on the zeroth core and choosing a global low power mode for the zeroth core to enter;

entering the global low power mode on the zeroth core;

receiving the RPM acknowledgment interrupt on the zeroth core; and releasing the spinlock.

39. The non-transitory computer readable storage medium of claim 29, wherein the stored processor-executable software instructions are configured to cause a processor to perform operations further comprising:

initiating a sending of an RPM message on a zeroth core;

receiving, in an RPM driver, an operating system lock;

entering a sleep mode on a first core of the multicore computing device and building an RPM transaction;

initiating a sending of a sleep set on the first core;

receiving a sleep set transaction request on the RPM driver from the first core and checking to determine if the operating system lock is held; and ignoring sleep set transaction request and sending an interrupt signal to the first core if it is determined that the operating system lock is held.

40. The non-transitory computer readable storage medium of claim 29, wherein the stored processor-executable software instructions are configured to cause a processor to perform operations further comprising using a spinlock to protect against one core starting an RPM transaction while another core sends another RPM transaction.

41. The non-transitory computer readable storage medium of claim 40, wherein the stored processor-executable software instructions are configured to cause a processor to perform operations such that using a spinlock to protect against one core starting an RPM transaction while another core is sending an RPM transaction comprises holding the spinlock during an RPM start operation and during a RPM stop operation.

42. The non-transitory computer readable storage medium of claim 40, wherein the stored processor-executable software instructions are configured to cause a processor to perform operations such that each core in the multicore computing device writes to disjoint parts of a sleep set, and wherein using a spinlock to protect against one core starting an RPM transaction while another core is sending an RPM transaction comprises releasing the spinlock when adding resources to the sleep set.

43. A multicore computing device, comprising:

means for managing resources shared by two or more execution environments in the multicore computing device via a resource power manager (RPM) processor;

means for maintaining a reference count in memory for each low power resource shared by more than one core of the multicore computing device;

means for determining which cores are asleep by accessing a variable shared between cores running threads and cores running idle threads, wherein the shared variable is incremented by each core upon the performance of an enter function of an idle thread and decremented by each core upon the performance of an exit function of the idle thread;

means for independently adjusting a value stored in memory based on each core's power state and each core's usage of the low power resource associated with the memory location; and means for using the value at the memory location to determine when to enter a system low power configuration.

44. The multicore computing device of claim 43, further comprising means for operating each core of the multicore computing device under an operating system that is different from that of one or more of the other cores in the multicore computing device.

45. The multicore computing device of claim 43, further comprising means for configuring the computing device such that at least one core of the multicore computing device shares at least one resource that binds the core to operations of at least one other core, and such that each core is configured to enter and exit low power modes independent of each of the other cores.

46. The multicore computing device of claim 43, further comprising:

means for identifying resources that may be placed in a low power mode based upon a flag bit setting;

means for registering a latency requirement on a per-core or global basis;

means for selecting a most stringent latency requirement from the registered latency requirements;

means for evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core;

means for selecting a combination of low power resource modes that maximizes potential power savings and has a total latency requirement that is less than or equal to the selected worst case latency requirement on the current core; and means for entering the selected combination of low power resource modes by executing an enter function of each of the selected low power modes on each of the identified resources.

47. The multicore computing device of claim 46, wherein means for entering the selected combination of low power resource modes by executing an enter function of each of the selected low power modes on each of the identified resources comprises means for executing the enter function when the reference count value equals zero, for shared modes.

48. The multicore computing device of claim 46, further comprising:

means for determining potential power savings of each evaluated low power resource mode based upon a potential power savings per unit time at a current temperature times an expected idle time, for the idle time expected on the current core.

49. The multicore computing device of claim 43, further comprising:

means for marking a resource for auto-invalidate; and means for invalidating, in the RPM processor, a sleep set associated with the marked resource.

50. The multicore computing device of claim 43, further comprising:

means for invalidating a previous transaction such that resources from the previous transaction does not enter their sleep set undesirably.

51. The multicore computing device of claim 43, wherein each core in the multicore computing device has a subsystem power management (SPM) hardware block that controls the power state of that core and handshakes with the RPM processor when the core enters its low power mode, the device further comprising:

means for detecting, in a RPM sleep driver, that a spinlock is currently being held;

means for ignoring the transaction and not sending a sleep set transaction in response to detecting that the spinlock is currently being held; and means for not applying the sleep set on the RPM processor despite the SPM hardware block of each core performing a handshake with the RPM.

52. The multicore computing device of claim 43, further comprising:

means for receiving, in a resource power manager (RPM) driver, a spinlock in active context;

means for entering a sleep mode of a first core of the multicore computing device;

means for initiating an idle process on a zeroth core of the multicore computing device while waiting for an RPM acknowledgment interrupt;

means for solving for sleep modes on the zeroth core and choosing a global low power mode for the zeroth core to enter;

means for entering the global low power mode on the zeroth core;

means for receiving the RPM acknowledgment interrupt on the zeroth core; and means for releasing the spinlock.

53. The multicore computing device of claim 43, further comprising:

means for initiating a sending of a resource power manager (RPM) message on a zeroth core;

means for receiving, in a resource power manager (RPM) driver, an operating system lock;

means for entering a sleep mode on a first core of the multicore computing device and building an RPM transaction;

means for initiating a sending of a sleep set on the first core;

means for receiving a sleep set transaction request on the RPM driver from the first core and checking to determine if the operating system lock is held; and means for ignoring sleep set transaction request and sending an interrupt signal to the first core if it is determined that the operating system lock is held.

54. The multicore computing device of claim 43, further comprising means for using a spinlock to protect against one core starting an RPM transaction while another core sends another RPM transaction.

55. The multicore computing device of claim 54, wherein means for using a spinlock to protect against one core starting an RPM transaction while another core is sending an RPM transaction comprises means for holding the spinlock during a RPM start operation and during a RPM stop operation.

56. The multicore computing device of claim 54, further comprises means for configuring the cores such that each core in the multicore computing device writes to disjoint parts of a sleep set, and wherein means for using a spinlock to protect against one core starting an RPM transaction while another core is sending an RPM transaction comprises means for releasing the spinlock when adding resources to the sleep set.

57. A method of conserving power in a multicore computing device, comprising:

maintaining a reference count in memory for each low power resource shared by more than one core of the multicore computing device;

independently adjusting a value stored in memory based on each core's power state and each core's usage of the low power resource associated with the memory location;

using the value at the memory location to determine when to enter a system low power configuration; and entering the system low power configuration by:

identifying resources that may be placed in a low power mode based upon a flag bit setting;

registering a latency requirement on a per-core or global basis;

selecting a most stringent latency requirement from the registered latency requirements;

evaluating low power modes for each resource that may be placed in a low power mode to eliminate any low power resource mode, or any combination of low power resource modes, that have a combined latency requirement that exceeds the selected most stringent latency tolerance, based on the latency restrictions present on the core;

selecting a combination of low power resource modes that maximizes potential power savings and has a total latency requirement that is less than or equal to the selected worst case latency requirement on the current core; and entering the selected combination of low power resource modes by executing an enter function of each of the selected low power modes on each of the identified resources.

58. The method of claim 57, wherein each core of the multicore computing device operates under an operating system that is different from that of one or more of the other cores in the multicore computing device.

59. The method of claim 57, wherein at least one core of the multicore computing device shares at least one resource that binds the core to operations of at least one other core, and each core is configured to enter and exit low power modes independent of each of the other cores.

60. The method of claim 57, wherein entering the selected combination of low power resource modes by executing an enter function of each of the selected low power modes on each of the identified resources comprises executing the enter function when the reference count value equals zero, for shared modes.

61. The method of claim 57, further comprising:

determining potential power savings of each evaluated low power resource mode based upon a potential power savings per unit time at a current temperature times an expected idle time, for the idle time expected on the current core.

62. A multicore computing device, comprising:

a memory; and one or more processors coupled to the memory, wherein the one or more processors are configured with processor-executable instructions so the multicore computing device performs operations comprising:

maintaining a reference count in memory for each low power resource shared by more than one core of the multicore computing device;

independently adjusting a value stored in memory based on each core's power state and each core's usage of the low power resource associated with the memory location;

using the value at the memory location to determine when to enter a system low power configuration; and entering the system low power configuration by:

identifying resources that may be placed in a low power mode based upon a flag bit setting;

registering a latency requirement on a per-core or global basis;

selecting a most stringent latency requirement from the registered latency requirements;

evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core;

selecting a combination of low power resource modes that maximizes potential power savings and has a total latency requirement that is less than or equal to the selected worst case latency requirement on the current core; and entering the selected combination of low power resource modes by executing an enter function of each of the selected low power modes on each of the identified resources.

63. The multicore computing device of claim 62, wherein the one or more processors are configured with processor-executable instructions so the multicore computing device performs operations such that each core of the multicore computing device operates under an operating system that is different from that of one or more of the other cores in the multicore computing device.

64. The multicore computing device of claim 62, wherein the one or more processors are configured with processor-executable instructions so the multicore computing device performs operations such that at least one core of the multicore computing device shares at least one resource that binds the core to operations of at least one other core, and each core is configured to enter and exit low power modes independent of each of the other cores.

65. The multicore computing device of claim 62, wherein the one or more processors are configured with processor-executable instructions so the multicore computing device performs operations such that entering the selected combination of low power resource modes by executing an enter function of each of the selected low power modes on each of the identified resources comprises executing the enter function when the reference count value equals zero, for shared modes.

66. The multicore computing device of claim 62, wherein the one or more processors are configured with processor-executable instructions so the multicore computing device performs operations further comprising:
determining potential power savings of each evaluated low power resource mode based upon a potential power savings per unit time at a current temperature times an expected idle time, for the idle time expected on the current core.

67. A non-transitory computer readable storage medium having stored thereon processor-executable software instructions configured to cause a processor to perform operations for conserving power in a multicore computing device, the operations comprising:
maintaining a reference count in memory for each low power resource shared by more than one core of the multicore computing device;
independently adjusting a value stored in memory based on each core's power state and each core's usage of the low power resource associated with the memory location;
using the value at the memory location to determine when to enter a system low power configuration; and
entering the system low power configuration by:
identifying resources that may be placed in a low power mode based upon a flag bit setting;
registering a latency requirement on a per-core or global basis;
selecting a most stringent latency requirement from the registered latency requirements;
evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core;
selecting a combination of low power resource modes that maximizes potential power savings and has a total latency requirement that is less than or equal to the selected worst case latency requirement on the current core; and
entering the selected combination of low power resource modes by executing an enter function of each of the selected low power modes on each of the identified resources.

68. The non-transitory computer readable storage medium of claim 67, wherein the stored processor-executable software instructions are configured to cause a processor to perform operations such that each core of the multicore computing device operates under an operating system that is different from that of one or more of the other cores in the multicore computing device.

69. The non-transitory computer readable storage medium of claim 67, wherein the stored processor-executable software instructions are configured to cause a processor to perform operations such that at least one core of the multicore computing device shares at least one resource that binds the core to operations of at least one other core, and each core is configured to enter and exit low power modes independent of each of the other cores.

70. The non-transitory computer readable storage medium of claim 67, wherein the stored processor-executable software instructions are configured to cause a processor to perform operations such that entering the selected combination of low power resource modes by executing an enter function of each of the selected low power modes on each of the identified resources comprises executing the enter function when the reference count value equals zero, for shared modes.

71. The non-transitory computer readable storage medium of claim 67, wherein the stored processor-executable software instructions are configured to cause a processor to perform operations further comprising:
determining potential power savings of each evaluated low power resource mode based upon a potential power savings per unit time at a current temperature times an expected idle time, for the idle time expected on the current core.

72. A multicore computing device, comprising:
means for maintaining a reference count in memory for each low power resource shared by more than one core of the multicore computing device;
means for independently adjusting a value stored in memory based on each core's power state and each core's usage of the low power resource associated with the memory location;
means for using the value at the memory location to determine when to enter a system low power configuration;
means for identifying resources that may be placed in a low power mode based upon a flag bit setting;
means for registering a latency requirement on a per-core or global basis;

means for selecting a most stringent latency requirement from the registered latency requirements;

means for evaluating on the computing device low power modes for each resource that may be placed in a low power mode to eliminate any low power resource mode, or any combination of low power resource modes, that have a combined latency requirement that exceeds the selected most stringent latency tolerance, based on the latency restrictions present on the core;

means for selecting a combination of low power resource modes that maximizes potential power savings and has a total latency requirement that is less than or equal to the selected worst case latency requirement on the current core; and means for entering the selected combination of low power resource modes by executing an enter function of each of the selected low power modes on each of the identified resources.

73. The multicore computing device of claim 72, further comprising means for operating each core of the multicore computing device under an operating system that is different from that of one or more of the other cores in the multicore computing device.

74. The multicore computing device of claim 72, further comprising means for configuring the computing device such that at least one core of the multicore computing device shares at least one resource that binds the core to operations of at least one other core, and such that each core is configured to enter and exit low power modes independent of each of the other cores.

75. The multicore computing device of claim 72, wherein means for entering the selected combination of low power resource modes by executing an enter function of each of the selected low power modes on each of the identified resources comprises means for executing the enter function when the reference count value equals zero, for shared modes.

76. The multicore computing device of claim 72, further comprising:

means for determining potential power savings of each evaluated low power resource mode based upon a potential power savings per unit time at a current temperature times an expected idle time, for the idle time expected on the current core.

* * * * *